United States Patent
Yaginuma et al.

(10) Patent No.: US 6,547,457 B2
(45) Date of Patent: Apr. 15, 2003

(54) CAMERA SHUTTER UNIT

(75) Inventors: Daisuke Yaginuma, Tokyo (JP);
Nobuaki Watanabe, Tokyo (JP);
Norihumi Ikeda, Tokyo (JP);
Tomokazu Kihara, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 21 days.

(21) Appl. No.: 09/960,168

(22) Filed: Sep. 21, 2001

(65) Prior Publication Data

US 2002/0037169 A1 Mar. 28, 2002

(30) Foreign Application Priority Data

Sep. 22, 2000 (JP) .................................. 2000-287858

(51) Int. Cl.[7] .................................................. G03B 9/00
(52) U.S. Cl. ........................ 396/460; 396/461; 396/463; 348/362
(58) Field of Search ................ 396/458, 459, 396/460, 461, 463, 468, 493, 494; 348/362–368

(56) References Cited

U.S. PATENT DOCUMENTS

| 5,012,271 A | * | 4/1991 | Nishimura et al. ......... 396/234 |
| 5,764,292 A | * | 6/1998 | Yamaguchi ................. 348/363 |
| 6,101,333 A | * | 8/2000 | Bullitt et al. ................. 396/61 |

FOREIGN PATENT DOCUMENTS

| JP | 62163027 | 7/1987 |
| JP | 6413529 | 1/1989 |
| JP | 2089034 | 3/1990 |
| JP | 2256034 | 10/1990 |
| JP | 6110106 | 4/1994 |
| JP | 6308570 | 11/1994 |
| JP | 7036081 | 2/1995 |
| JP | 10221740 | 8/1998 |

* cited by examiner

Primary Examiner—David M. Gray
(74) Attorney, Agent, or Firm—Pillsbury Winthrop LLP

(57) ABSTRACT

The camera shutter unit of the present invention comprises a diaphragm blade arranged to be capable of moving between a stopping-down position wherein an aperture is stopped down, and an evacuating position wherein the aperture is opened. A shutter blade is arranged to be capable of moving between an opening position, wherein the aperture is opened, and a closing position, wherein the aperture is closed. A dive-control mechanism is provided for drive-controlling the shutter blade and the diaphragm blade. The drive-control mechanism has a single electromagnetic drive source, a spring for restricting movement of the shutter blade toward the closing position when the diaphragm blade is positioned in the stopping-down position, and for releasing its restriction by a predetermined or more drive force generated by the electromagnetic drive source, and a control means for controlling the electromagnetic drive source. The control means, upon stopping down, controls to move the shutter blade to the closing position in advance and next move in reverse the shutter blade by a predetermined amount, thereby positioning the diaphragm blade in the stopping-down position. Accordingly, the unit can be of a small size and low in cost, and the bouncing of diaphragm blade can be prevented.

28 Claims, 15 Drawing Sheets

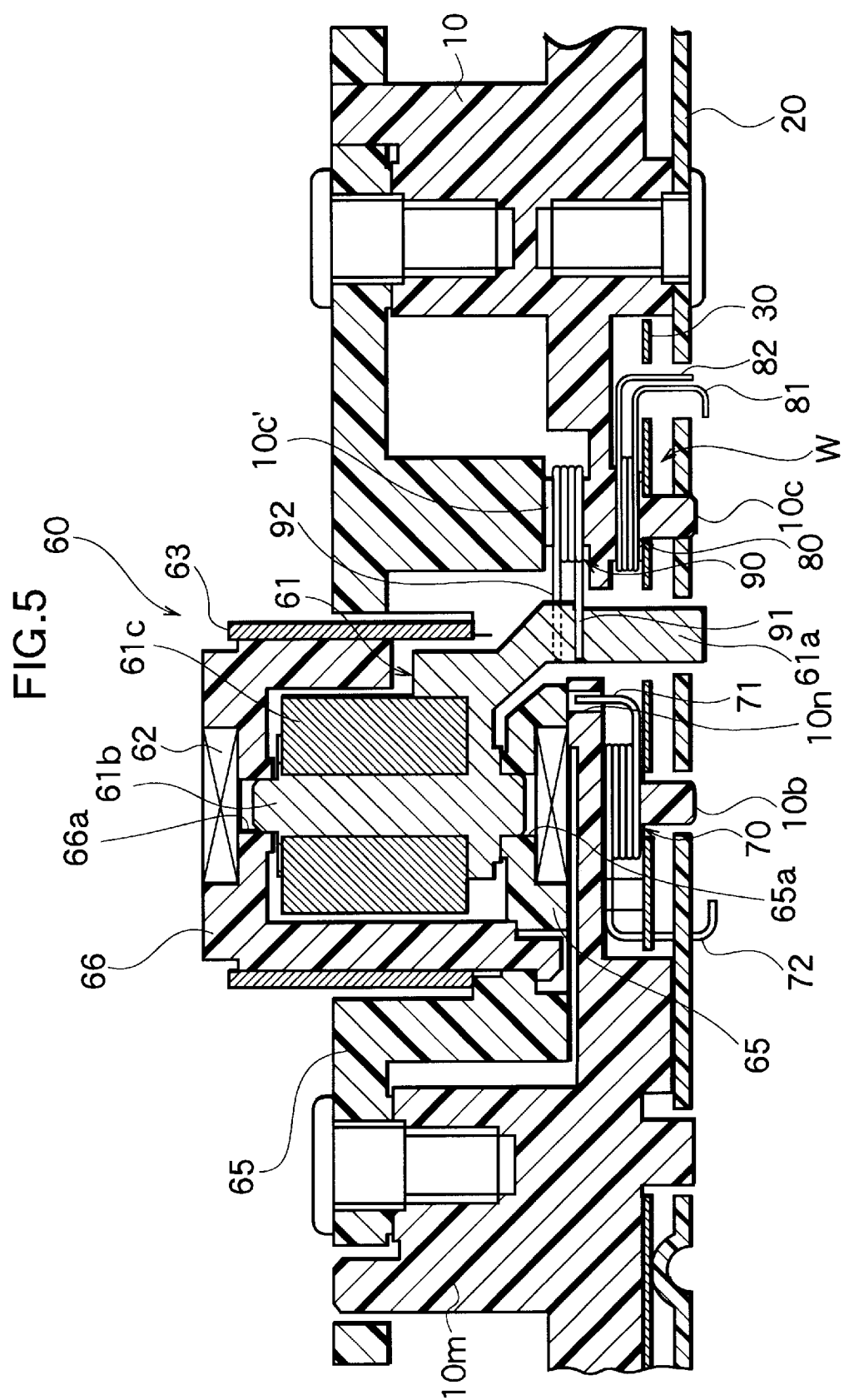

CAMERA SHUTTER UNIT

BACKGROUND OF THE INVENTION

1. Field of the Invention

The present invention relates to a camera shutter unit adapted to a digital still camera or the like and, more particularly to a camera shutter unit which is separately provided with a shutter blade for opening and closing an exposure aperture and a diaphragm blade for stopping down the aperture.

2. Description of the Related Art

Unexamined Japanese Patent Publication kokai) No.10-221740, for example, discloses a conventional camera shutter unit which is separately provided with a shutter blade for opening and closing an exposure aperture where through light passes and a diaphragm blade for stopping down the aperture.

This camera shutter unit includes a shutter blade arranged at a periphery of the aperture so as to move back and forth to open and close the aperture, one electromagnetic drive source for driving the shutter blade, a diaphragm blade arranged so as to move back and forth to stop down the aperture and release the stopping-down, and another electromagnetic drive source for driving the diaphragm blade.

Thereupon, when respective electromagnetic drive sources start, the shutter blade moves back and forth between an opening position wherein the aperture is opened and a closing position wherein the aperture is closed to open and close the aperture and the diaphragm blade moves back and forth between a stopping-down position wherein the aperture is stopped down and an evacuating position wherein the aperture is not stopped down. Also, when respective electromagnetic drive sources are not energized, the shutter blade is held in either the opening position or the closing position and the diaphragm blade is held in either the stopping-down position or the evacuating position.

By the way, with respect to the above conventional camera shutter unit, separate drive sources are provided for driving the shutter blade and the diaphragm blade. Therefore, the shutter blade and the diaphragm blade can be driven separately without using a complicated linkage. However, since separate electromagnetic drive sources are provided, the unit is large-sized, heavyweight, high-cost or the like and consumes a large amount of power in accordance with the number of electromagnetic drive sources.

Also, upon drive of the diaphragm blade and so on, in case only the electromagnetic drive source starts to move the diaphragm blade, when being positioned in a predetermined stopping-down position, the diaphragm blade may bounce and therefore, when stopping down rapidly, the response characteristic of diaphragm blade is not preferable.

In view of the foregoing, an object of the present invention is to provide a a camera shutter unit which adopts a mechanism for interlocking a diaphragm blade with a shutter blade without complexity of the unit so that the shutter blade and the diaphragm blade can function reliably and the diaphragm blade can be positioned to perform a desired stopping-down operation reliably, with a small size, lightweight, low-cost, or the like.

SUMMARY OF THE INVENTION

To achieve the above-mentioned object, a camera shutter unit according to the first aspect of the present invention comprises a base plate having an exposure aperture, a diaphragm blade arranged to be capable of moving between a stopping-down position wherein the aperture is stopped down and an evacuating position wherein the aperture is opened (is not stopped down), a shutter blade arranged to be capable of moving between an opening position wherein the aperture is opened and a closing position wherein the aperture is dosed, and a drive-control mechanism for drive-controlling the shutter and diaphragm blades. The drive-control mechanism is composed of a single electromagnetic drive source which can drive the shutter and diaphragm blades to interlock the diaphragm blade with the shutter blade such that the opening position corresponds to the evacuating position and a travel of from a way position between the opening position and the dosing position to the closing position corresponds to the stopping-down position, a restricting means for restricting movement of the shutter blade toward the dosing position when the diaphragm blade is positioned in the stopping-down position and for releasing its restriction by a predetermined or more level drive force which is generated by the electromagnetic drive source, and a control means for controlling the electromagnetic drive source. The control means controls, when moving to position the diaphragm blade in the stopping-down position, to move the shutter blade to the closing position in advance and next move in reverse the shutter blade by a predetermined amount.

Accordingly, when the single electromagnetic drive source starts, the shutter blade moves from the opening position to the closing position or from the closing position to the opening position, and the diaphragm blade moves from the evacuating position to the stopping-down position or from the stopping-down position to the evacuating position while following the shutter blade. Thus, the single electromagnetic drive source can drive the shutter and diaphragm blades and there is provided the restricting means, which can restrict movement of the shutter blade and can release its restriction, in accordance with the amount of drive force generated by the electromagnetic drive source. Therefore, the shutter and diaphragm blades can function reliably and the unit can be downsized, lightened, or the like. Also, in case the stopping-down operation by the diaphragm blade is carried out, the diaphragm blade is first moved to the dosing position and then is moved in reverse by a predetermined amount, thereby being positioned in the stopping-down position. Therefore, the bouncing of diaphragm blade upon stopping-down operation can be restrained or prevented, whereby the stopping-down operation can be carried out rapidly and reliably.

A camera shutter unit according to the second aspect of the present invention comprises a base plate having an exposure aperture, a diaphragm blade arranged to be capable of moving between a stopping-down position wherein the aperture is stopped down and an evacuating position wherein the aperture is opened (is not stopped down), a shutter blade arranged to be capable of moving between an opening position wherein the aperture is opened and a closing position wherein the aperture is closed, and a drive-control mechanism for drive-controlling the shutter and diaphragm blades. The drive-control mechanism is composed of a single electromagnetic drive source which can drive the shutter and diaphragm blades to interlock the diaphragm blade with the shutter blade such that the opening position corresponds to the evacuating position and a travel of from a way position between the opening position and the closing position to the closing position corresponds to the stopping-down position, a restricting means for restricting movement of the shutter blade toward the dosing position when the diaphragm blade is positioned in the stopping-down position and for releasing its restriction by a predetermined or more level drive force which is generated by the electromagnetic drive source, and a control means for controlling the electromagnetic drive source. The control means controls, when moving to position the diaphragm blade in the stopping-down position, to move the shutter blade up to a nearby position beyond a way position corresponding to the stopping-down position in advance and next move in reverse the shutter blade by a predetermined amount.

Accordingly, when the single electromagnetic drive source starts, the shutter blade moves from the opening position to the closing position or from the closing position to the opening position, and the diaphragm blade moves from the evacuating position to the stopping-down position or from the stopping-down position to the evacuating position while following the shutter blade. Thus, the single electromagnetic drive source can drive the shutter and diaphragm blades and there is provided the restricting means, which can restrict movement of the shutter blade and can release its restriction, in accordance with the amount of drive force generated by the electromagnetic drive source. Therefore, the shutter and diaphragm blades can function reliably and the unit can be downsized, lightened, or the like. Also, in case the stopping-down operation by the diaphragm blade is carried out, the diaphragm blade is fast moved up to a nearby position beyond a way position corresponding to the stopping-down position and then is moved in reverse by a predetermined amount, thereby being positioned in the stopping-down position. Therefore, the bouncing of diaphragm blade upon stopping-down operation can be restrained or prevented, whereby the stopping-down operation can be carried out rapidly and reliably.

In the above units according to the first and second aspects, when moving to position the diaphragm blade in the stopping-down position, the control means may control the electromagnetic drive source so as to decrease electric current continuously, so as to decrease electric current in the form of steps, or so as to decrease electric power continuously. Accordingly, the stopping-down operation can be carried out rapidly and reliably, and the response characteristic of diaphragm blade can be improved.

A camera shutter unit according to the third aspect of the present invention comprises a base plate having an exposure aperture, a diaphragm blade arranged to be capable of moving between a stopping-down position wherein the aperture is stopped down and an evacuating position wherein the aperture is opened (is not stopped down), a shutter blade arranged to be capable of moving between an opening position wherein the aperture is opened and a closing position wherein the aperture is closed, and a drive-control mechanism for drive-controlling the shutter and diaphragm blades. The drive-control mechanism is composed of a single electromagnetic drive source which can drive the shutter and diaphragm blades to interlock the diaphragm blade with the shutter blade such that the opening position corresponds to the evacuating position and a travel of from a way position between the opening position and the closing position to the closing position corresponds to the stopping-down position, a restricting means for restricting movement of the shutter blade toward the closing position when the diaphragm blade is positioned in the stopping-down position and for releasing its restriction by a predetermined or more level drive force which is generated by the electromagnetic drive source, and a control means for controlling the electromagnetic drive source. The control means controls, when moving to position the diaphragm blade in the stopping-down position, to move the diaphragm blade from the evacuating position to the stopping-down position gradually.

Accordingly, when the single electromagnetic drive source starts, the shutter blade moves from the opening position to the closing position or from the closing position to the opening position, and the diaphragm blade moves from the evacuating position to the stopping-down position or from the stopping-down position to the evacuating position while following the shutter blade. Thus, the single electromagnetic drive source can drive the shutter and diaphragm blades and there is provided the restricting means, which can restrict movement of the shutter blade and can release its restriction, in accordance with the amount of drive force generated by the electromagnetic drive source. Therefore, the shutter and diaphragm blades can function reliably and the unit can be downsized, lightened, or the like. Also, in case the stopping-down operation of the diaphragm blade is carried out, the diaphragm blade is gradually moved from the evacuating position to the stopping-down position, thereby being positioned in the stopping-down position. Therefore, the bouncing of diaphragm blade upon stopping-down operation can be restrained or prevented, whereby the stopping-down operation can be carried out rapidly and reliably.

In the above unit according to the third aspect, when moving to position the diaphragm blade in the stopping-down position, the control means may control the electromagnetic drive source so as to increase electric current continuously, so as to increase electric current in the form of steps, or so as to increase electric power continuously. Accordingly, the stopping-down operation can be carried out rapidly and reliably, and the response characteristic of diaphragm blade can be improved.

Also, in the above units according to the first to third aspects, after positioning the shutter blade in the closing position, the control means may control the electromagnetic drive source so as to decrease electric current to a predetermined level that can hold the shutter blade in the closing position or so as to decrease electric power to a predetermined level that can hold the shutter blade in the closing position. Accordingly, the power consumption of the unit can be reduced and damage to the electromagnetic drive source caused by exothermic reaction can be prevented.

Also, in the above units according to the first to third aspects, in accordance with each operation of the shutter blade and the diaphragm blade, the control means may control the electromagnetic drive source so as to change electric current or so as to change electric power. Accordingly, efficient control suitable for each operation can be performed, whereby the power consumption of the unit can be reduced and the stopping-down operation can be carried out reliably and further the response characteristic of diaphragm blade can be improved.

In the above units, the units may comprise a torsion spring for interlocking the diaphragm blade with the shutter blade, and one end of the torsion spring is hooked on the diaphragm blade and another end of the torsion spring is hooked on the shutter blade. Accordingly, the looseness between the shutter and diaphragm blades can be absorbed, whereby the variation in initial setting load of the torsion spring can be restricted or prevented.

In the above units, the units may comprise a spring engaged with a part of the electromagnetic drive source in order to position and hold the shutter blade in the opening position and the diaphragm blade in the evacuating position, with the electromagnetic drive source being non-energized. Accordingly, since the spring holds the shutter blade in the opening position and the diaphragm blade in the evacuating position, in comparison with the case using a magnetic attracting force, the variation in holding force can be reduced, and the number of composing parts can be reduced.

In the above units, the units may comprise a spring engaged with a part of the electromagnetic drive source in order to position and hold the shutter blade in the way position and the diaphragm blade in the stopping-down position, with the electromagnetic drive source being non-energized. Accordingly, since the spring holds the shutter blade in the way position and the diaphragm blade in the stopping-down position, in comparison with the case using a magnetic attracting force, the variation in holding force can be reduced, and the number of composing parts can be reduced.

In the above units, the restricting means may be of a torsion spring which urges the shutter blade toward the opening position when the shutter blade is located between the closing position and the way position wherein the diaphragm blade is in the stopping-down position, and which has a straight contact portion capable of coming in contact with the shutter blade and inclined to a plane wherein the shutter blade moves. Accordingly, a working force between the torsion spring serving as a restricting means and the shutter blade, namely, a force of the shutter blade that deforms the torsion spring or a force of the torsion spring that pushes the shutter blade is efficiently and reliably transmitted.

In the above unit, an arm portion of the torsion spring supporting the straight contact portion may extend perpendicular to a moving direction of the shutter blade. Accordingly, the operation loss of the torsion spring can be reduced and its urging force can act on the shutter blade efficiently. This allows the shutter blade and the torsion spring to work stabely.

In the above units, the electromagnetic drive source may be composed of a rotor having a driving pin, a coil for energizing, and a yoke forming a magnetic circuit. The diaphragm blade may have a first contact portion with which the driving pin comes in contact temporarily to drive enroute to the stopping-down position from the evacuating position. Accordingly, in addition that the diaphragm blade moves while following the shutter blade, since the driving pin comes in contact with the first contact portion temporarily to drive the diaphragm blade directly namely to kick the diaphragm blade, the response characteristic of diaphragm blade can be improved.

In the above units, the electromagnetic drive source may be composed of a rotor having a driving pin, a coil for energizing, and a yoke forming a magnetic circuit. The diaphragm blade may have a second contact portion which extends perpendicular to a moving direction of the driving pin in both side regions of the stopping-down position and the evacuating position and with which the driving pin comes in contact to drive. Accordingly, since there is provided the second contact portion, which extends perpendicular to the moving direction of the driving pin in both side regions of the stopping-down position and the evacuating position, namely, which has edge portions extending toward the rotation center of the rotor in both nearby regions close to the stopping-down position and the evacuating position, the operating angle of the diaphragm blade can be increased without enlarging the range of rotation angle of the rotor. Consequently, in case the rotation angle of the rotor is limited, the unit can be suitable.

In the above units, the shutter and diaphragm blades may be arranged within a common blade room. Accordingly, the unit can be thin, and the interlocking mechanism between the shutter and diaphragm blades can be simplified.

BRIEF DESCRIPTION OF THE DRAWINGS

The above and other objects and features of the present invention will become understood from the following description taken in connection with the accompanying drawings in which:

FIG. 5 is a spread sectional view showing an electromagnetic drive source and nearby portions thereof forming part of the camera shutter unit;

DESCRIPTION OF THE PREFERRED EMBODIMENTS

Hereinbelow, preferred embodiments of a camera shutter unit according to the present invention will be described with reference to the accompanying drawings.

Figure 1:
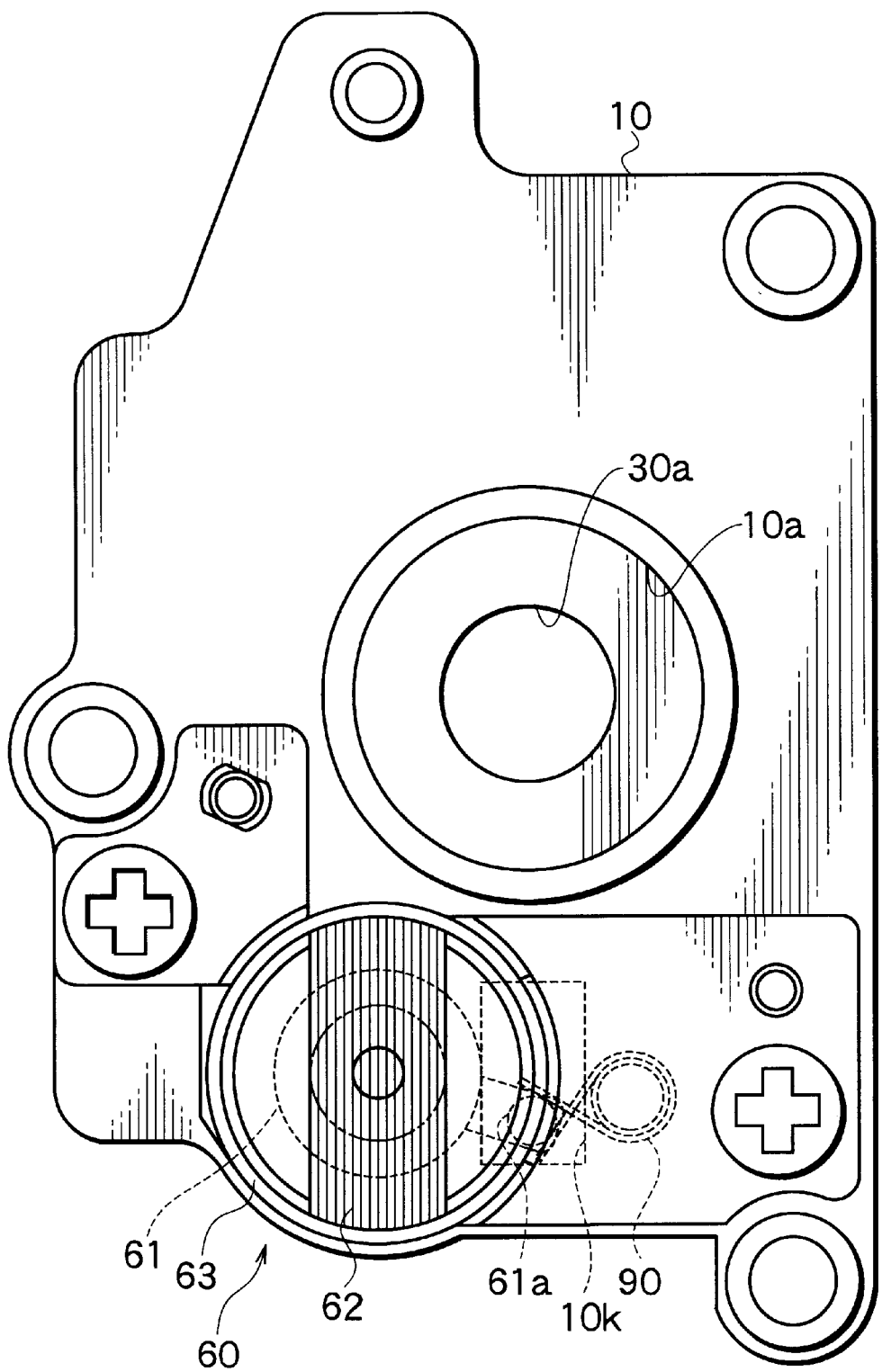
FIG. 1 is a plan view showing an embodiment of a camera shutter unit according to the present invention.
Figure 2:
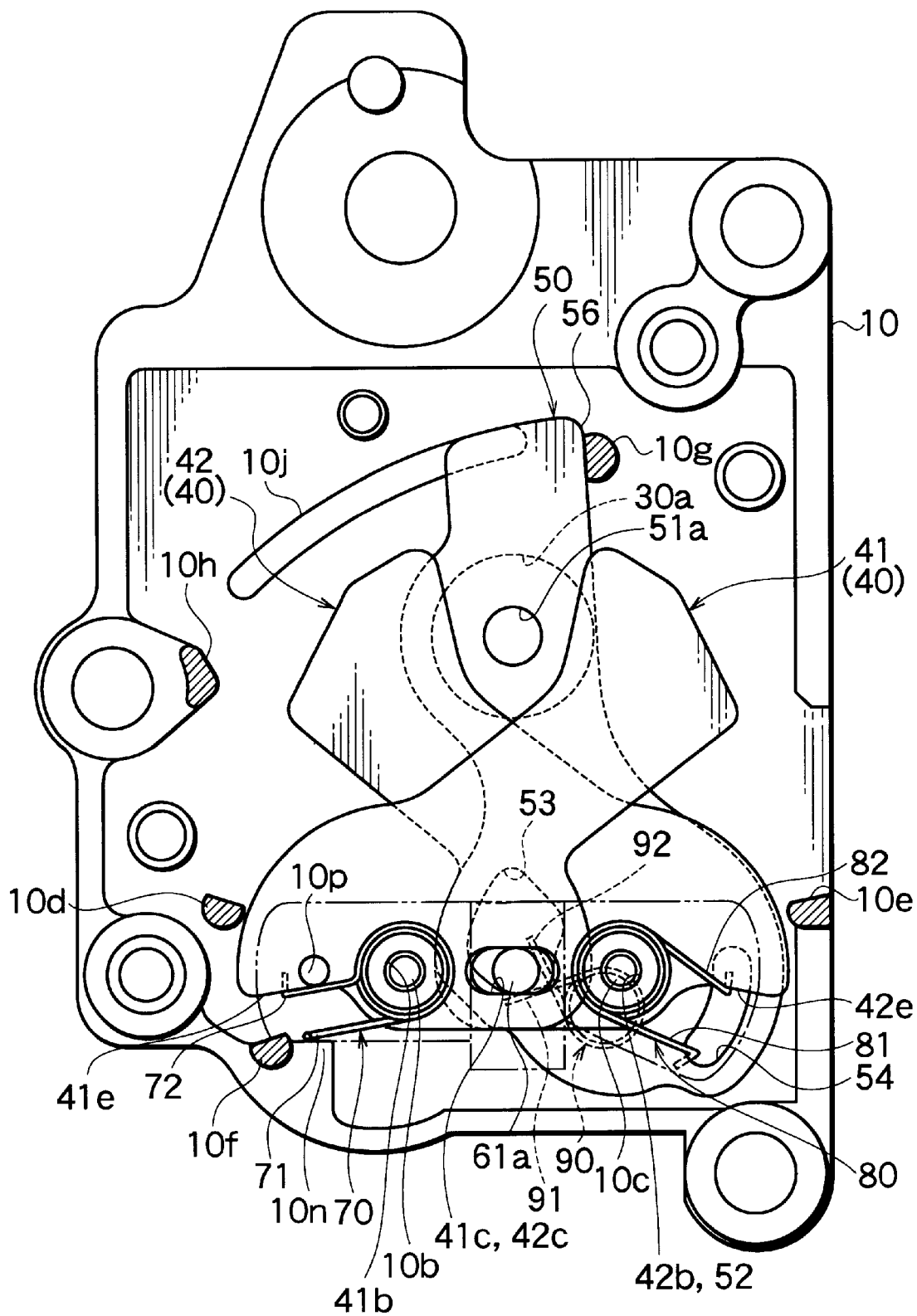
FIG. 2 is a plan view showing an internal structure of the camera shutter unit.

In this embodiment, the camera shutter unit is, as shown in FIG. 1, FIG. 2 and FIG. 5, provided with a base plate 10 and a covering plate 20 defining an outline of the unit, a middle plate 30 sandwiched between the base plate 10 and the covering plate 20 and forming an exposure aperture 30a through which light passes, a shutter blade 40 for opening and closing the aperture 30a, a diaphragm blade 50 having an opening for obtaining a predetermined aperture diameter, and a drive-control mechanism, which includes an electromagnetic drive source 60, a restricting means 70, and a control means (CPU and the like), for driving and controlling so as to move the shutter blade 40 and the diaphragm blade 50 at a predetermined timing.

The electromagnetic chive source 60 forming part of the drive-control mechanism is, as shown in FIG. 1 and FIG. 5, a moving magnet type actuator such as an iris motor which is composed of a rotor 61 rotatable-arranged within the range of a predetermined angle, a coil 62 for energizing, a cylindrical yoke 63 arranged to form a magnetic circuit, and inside and outside supporting frames 65, 66 for supporting these parts.

The rotor 61 is in the shape of a column, and as shown in FIG. 5, is composed of a rotation shaft 61b integrally formed with the driving pin 61a, a permanent magnet 61c and so forth. Here, the rotation shaft 61b and the driving pin 61a are molded with resin material and the like. The permanent magnet 61c is magnetized to N and S poles. Further, both ends of the rotation shaft 61b are respectively rotatable-supported by a bearing hole 66a on the outside supporting frame 66 and a bearing hole 65a on the inside supporting frame 65. Besides, the inside supporting frame 65 is fixed to a mounting flange 10m formed with the base plate 10 by screws and the like. The outside supporting frame 66 is fixed to the inside supporting frame 65 by a connecting claw and the like.

The base plate 10 is, as shown in FIG. 1, formed with a rectangular-shaped outline and made of resin material and the like. An outside center portion of the base plate 10 is provided with an aperture 10a which is formed to expose the aperture 30a. A backside of the base plate 10 is, as shown in FIG. 5, provided with supporting shafts 10b, 10c which rotatable-support the shutter blade 40 and the diaphragm blade 50 respectively, as shown in FIG. 2, open side stoppers 10d, 10e and a close side stopper 10f which restrict movement of the shutter blade 40, a stopping-down side stopper 10g and a release side stopper 10h which restrict movement of the diaphragm blade 50, a supporting rib 10j which supports the diaphragm blade 50, or the like. Also, as shown in FIG. 1, the base plate 10 is provided with an opening 10k, which allows the movement of a driving pin 61a.

The covering plate 20 has a rectangular-shaped outline as same to that of the base plate 10 and, as shown in FIG. 5, is connected to the base plate 10 with a concave-convex fitting method, screws, or the like. Also, the middle plate 30 is sandwiched between the base plate 10 and the covering plate 20. Further, arranged within the space between the middle plate 30 and the base plate 10 are, as shown in FIG. 5, a torsion spring 70 serving as a restricting means, a torsion spring 80 for interlocking the diaphragm blade 50 with the shutter blade 40, or the like.

Also, arranged on the outside of the base plate 10 is a torsion spring 90 which holds the shutter blade 40 and the diaphragm blade 50 in predetermined positions. Further, defined between the middle plate 30 and the covering plate 20 is a blade room W, in which the shutter blade 40 and the diaphragm blade 50 are arranged. Besides, the middle plate 30 mainly defines the blade room W and further defines an aperture diameter by the aperture 30a having a relative small aperture diameter.

Thus, since the shutter blade 40 and the diaphragm blade 50 are arranged within the common blade room W, the unit can be thin, and the interlocking mechanism between the shutter and diaphragm blades can be simplified.

Figure 3A:
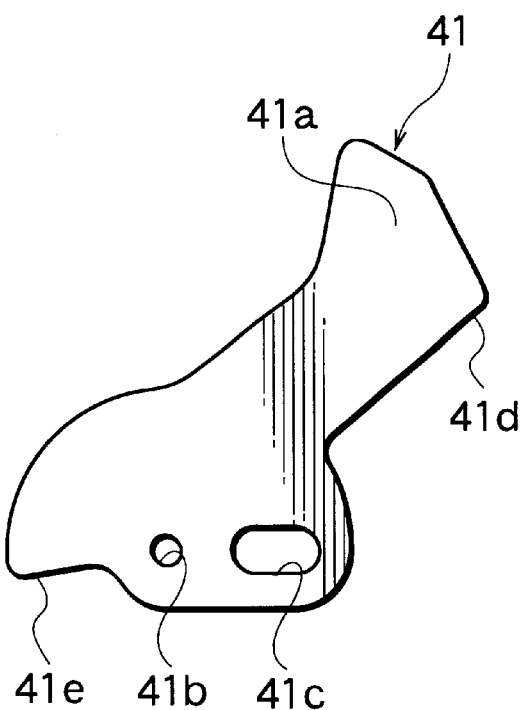
FIGS. 3A and 3B are plan views showing first and second shutter blades forming part of the camera shutter unit.
Figure 3B:
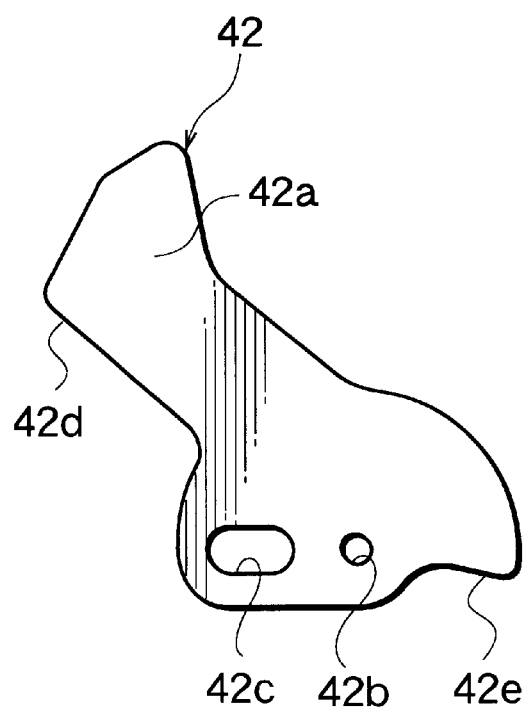

The shutter blade 40 is, as shown in FIG. 2, FIG. 3A, and FIG. 3B, composed of two blades of a first shutter blade 41 and a second shutter blade 42, respective which are formed with shield portions 41a, 42a, holes 41b, 42b rotatable-supported by supporting shafts 10b, 10c, and elongated holes 41c, 42c to which the driving pin 61a of the electromagnetic drive source 60 is connected.

Consequently, when the driving pin 61a that is inserted (movable fitted) into elongated holes 41c, 42c moves toward the under side on FIG. 2, the first shutter blade 41 and the second shutter blade 42 respectively rotate to be positioned in the opening position wherein the aperture 30a is opened. On the other hand, when the driving pin 61a moves toward the upper side on FIG. 2, the first shutter blade 41 and the second shutter blade 42 respectively rotate to be positioned in the closing position wherein the aperture 30a is closed.

Figure 7:
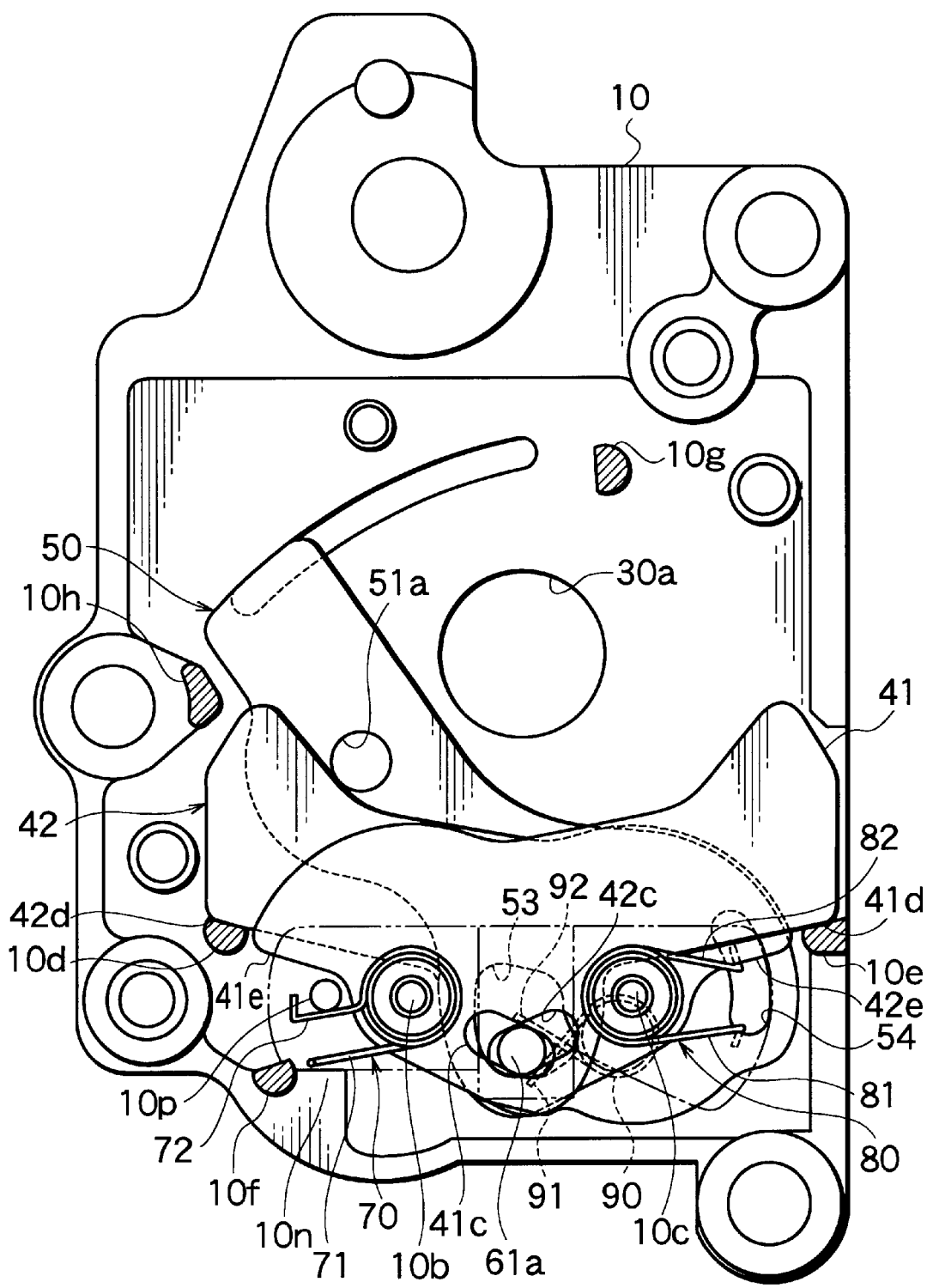
FIG. 7 is a plan view showing a condition in which the shutter blade is in the opening position wherein the aperture is opened and the diaphragm blade is in the evacuating position wherein the aperture is not stopped down.
Figure 9:
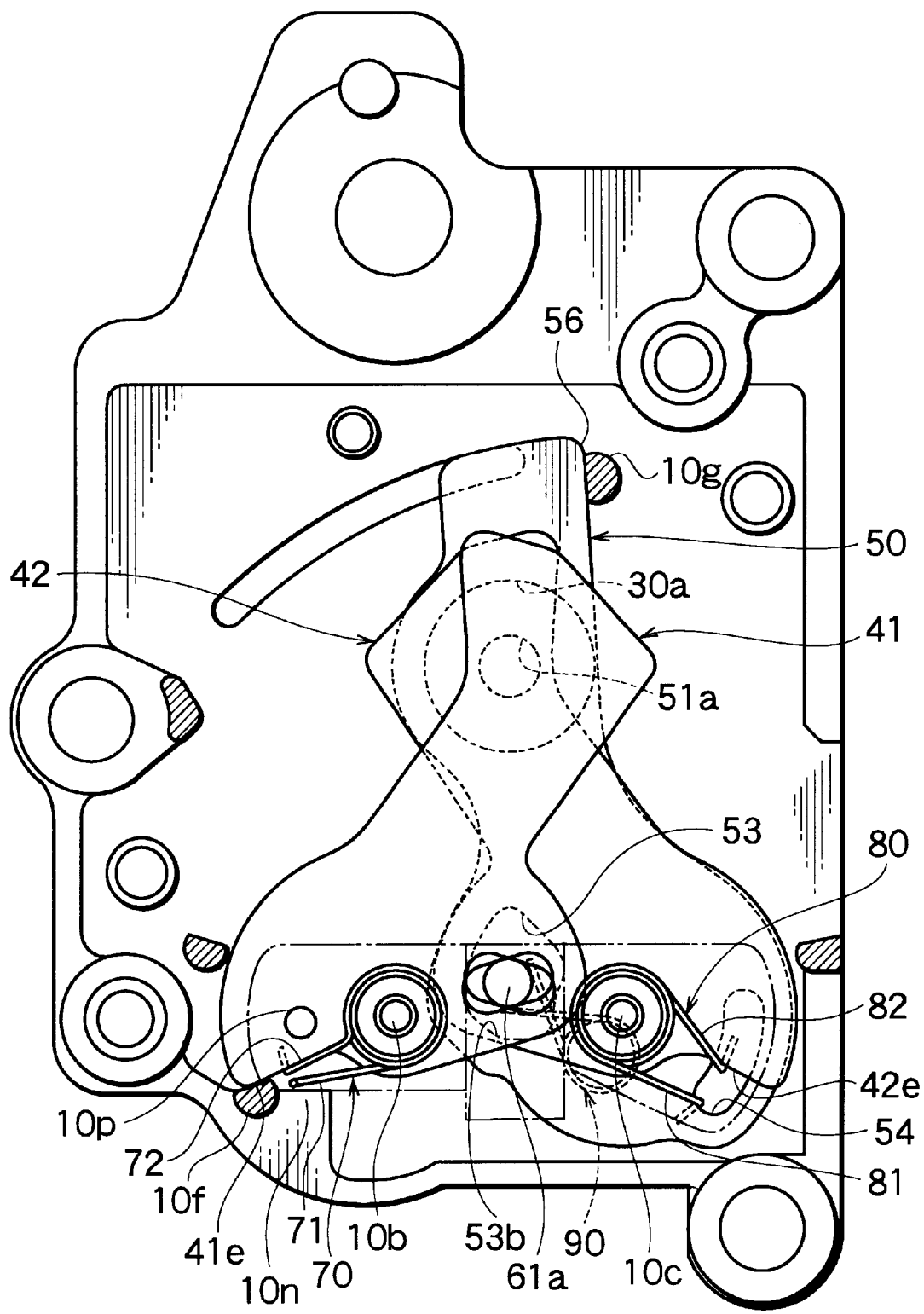
FIG. 9 is a plan view showing a condition in which the shutter blade is in the dosing position wherein the aperture is dosed and the diaphragm blade is in the stopping-down position wherein the aperture is stopped down.

Here, in the opening position, as shown in FIG. 7, an edge 41d of the first shutter blade 41 is in contact with the stopper 10e and an edge 42d of the second shutter blade 42 is in contact with the stopper 10d, whereby excess movements toward the opening side of first and second shutter blades 41, 42 are restricted. Also, in the closing position, as shown in FIG. 9, an edge 41e of the first shutter blade 41 is in contact with the stopper 10f, whereby excess movements toward the closing side of first and second shutter blades 41, 42 are restricted. Besides, the first shutter blade 41 and the second shutter blade 42 are interlocked with each other. Therefore, even if only one of stoppers 10d, 10e is adopted, each movement of both blades can be restricted.

Figure 4:
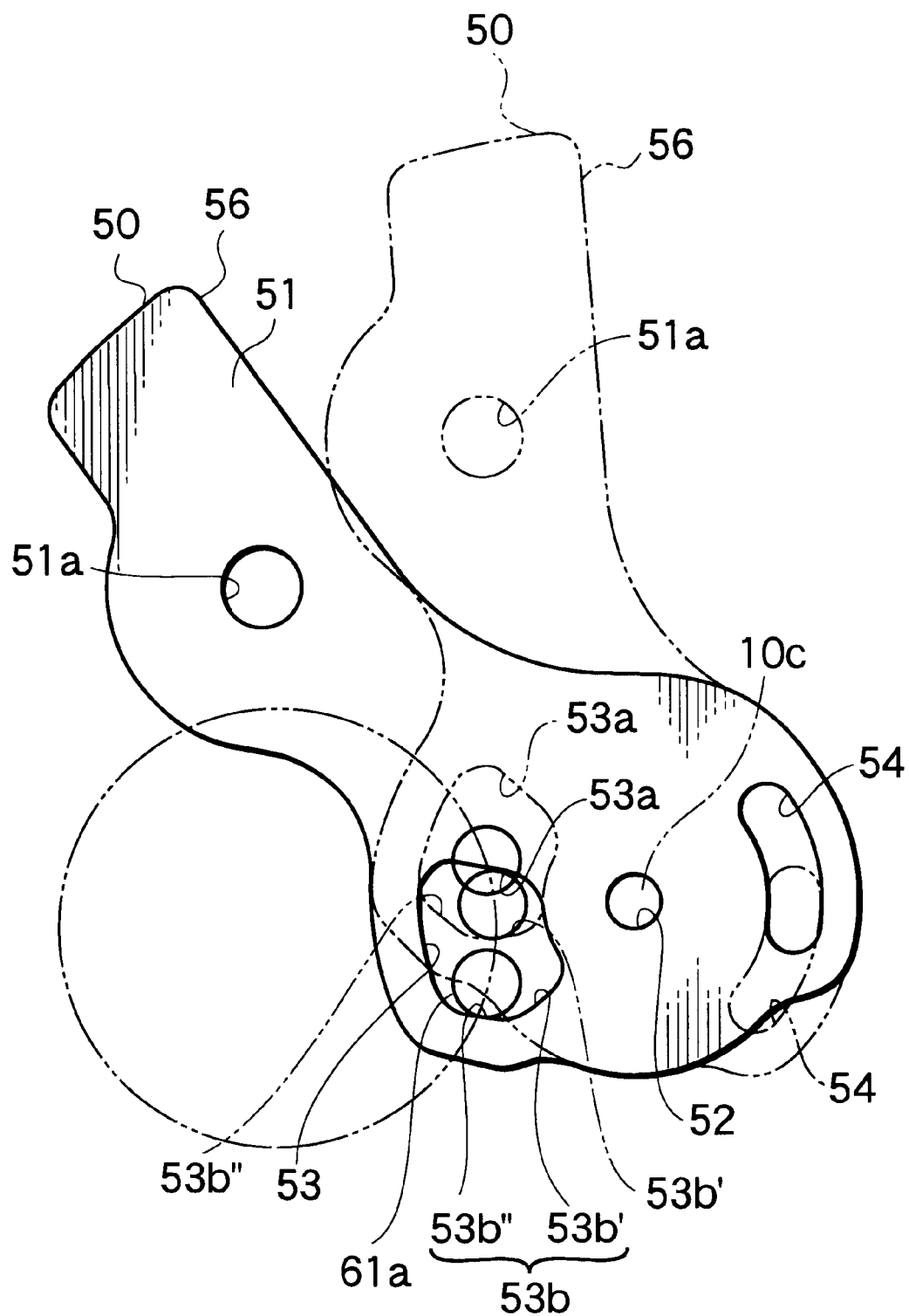
FIG. 4 is a plan view showing a diaphragm blade forming part of the camera shutter unit.

The diaphragm blade 50 is, as shown in FIG. 2 and FIG. 4, composed of a diaphragm portion 51 having an opening 51a that is specified by a predetermined aperture diameter, a hole 52 supported by the supporting shaft 10c, a contact hole 53 capable of coming in contact with the driving pin 61a, an elongated hooking hole 54 on which the torsion spring 80 is hooked, or the like. As shown in FIG. 2, the diaphragm blade 50 is rotatable-supported by the supporting shaft 10c at its hole 52.

Also, the contact hole 53 is, as shown in FIG. 4, provided with a first contact portion 53a with which the driving pin 61a comes in contact temporarily to drive enroute to the stopping-down position from the evacuating position. Consequently, upon stopping-down operation, the driving pin 61a comes in contact with the first contact portion 53a directly to drive the diaphragm blade 50 temporarily namely to kick the diaphragm blade 50, whereby the response characteristic in stopping down can be improved.

Further, the contact hole 53 is, as shown in FIG. 4, provided with a second contact portion 53b which extends perpendicular to a moving direction of the driving pin in the region of the stopping-down position (indicated by two dot-dash line) side and in the region of the evacuating position (indicated by solid line) side and with which the driving pin comes in contact to drive the diaphragm blade 50.

That is, when the diaphragm blade 50 is in the stopping down position side, the driving pin 61a is in contact with the second contact portion 53b' having an edge portion which is close to the supporting shaft 10c and extends toward the rotation center of the rotor 61. On the other hand, when the diaphragm blade 50 is in the evacuating position side, the driving pin 61a is in contact with the second contact portion 53b" having an edge portion which is away from the supporting shaft 10c and extends nearly toward the rotation center of the rotor 61.

This allows an operating angle of the diaphragm blade to be increased without enlarging the range of rotation angle of the rotor. Consequently, in case the rotation angle of the rotor is limited, the unit can be suitable. Also, the unit can be downsized.

Also, arranged between the diaphragm blade 50 and the second shutter blade 42 is, as shown in FIG. 2 and FIG. 5, the torsion spring 80 which is outerfitted to the supporting shaft 10c to interlock the diaphragm blade 50 with the second shutter blade 42.

That is, as shown in FIG. 2, one end 81 of the torsion spring 80 is hooked on the hooking hole 54 of the diaphragm blade 50, and another end 82 is hooked on an edge 42e of the second shutter blade 42, and further the second shutter blade 42 and the diaphragm blade 50 are continually urged in opposite directions to each other about the supporting shaft 10c, so that the diaphragm blade 50 is capable of following movement of the second shutter blade 42.

Accordingly, the interlocking connection between both can be obtained, and the looseness between the shutter and diaphragm blades can be absorbed, and further the variation in initial setting load of the torsion spring can be restricted or prevented.

Figure 8:
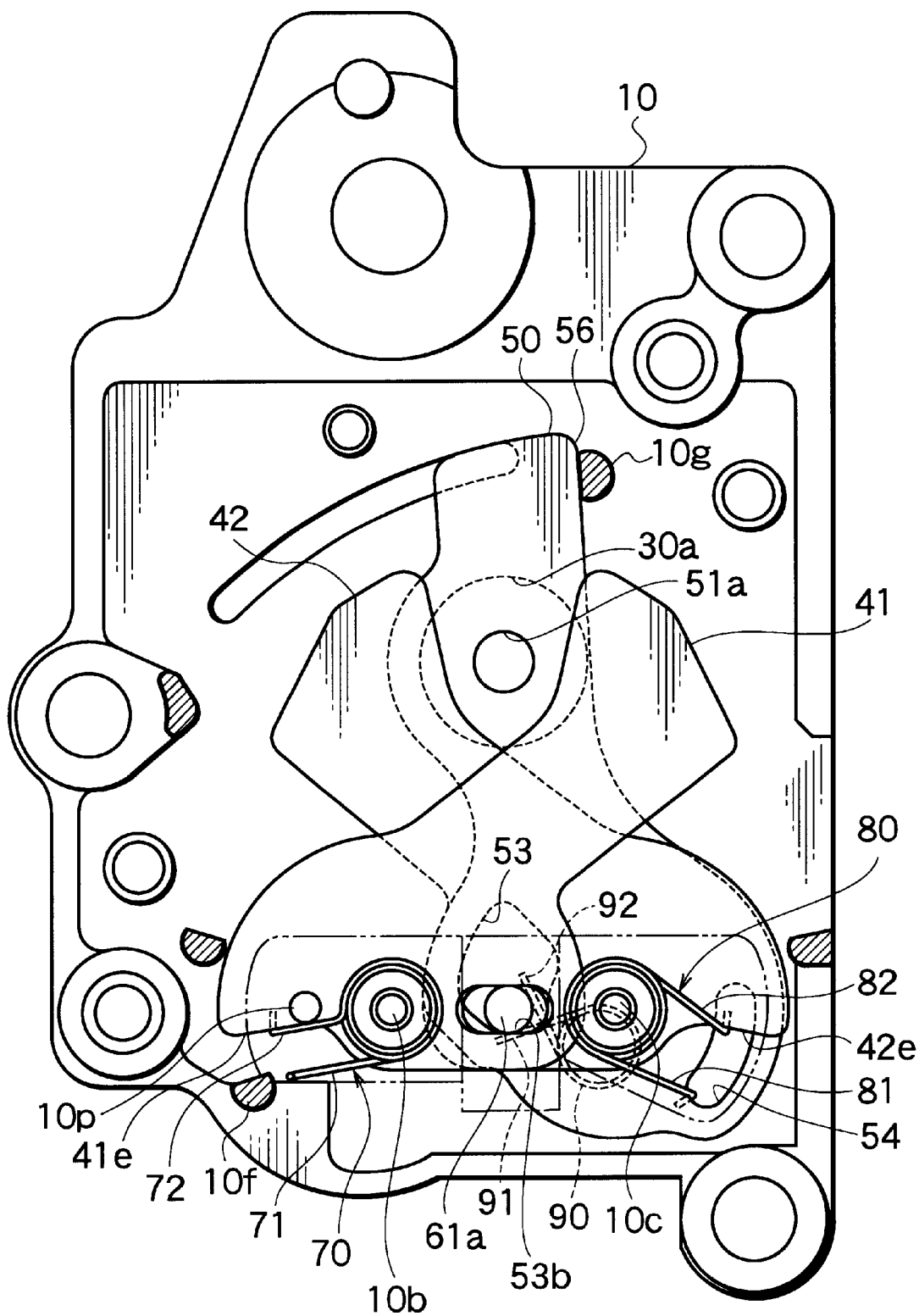
FIG. 8 is a plan view showing a condition in which the shutter blade is in the way position and the diaphragm blade is in the stopping-down position wherein the aperture is stopped down.

Further, as shown in FIG. 2, the driving pin 61a is movably inserted (or movably fitted) into the contact hole 53 of the diaphragm blade 50. When the diaphragm blade 50 is not over the aperture 30a, the urging force of the torsion spring 80 makes the second contact portion 53b of the contact hole 53 in contact with the driving pin 61a. When the driving pin 61a moves toward the under side on FIG. 2, the first shutter blade 41 and the second shutter blade 42 move toward the opening direction (toward the opening position) and then, as shown in FIG. 7, the diaphragm blade 50 rotates in the counterclockwise direction to reach the evacuating position wherein the aperture 30a is opened. On the other hand, when the driving pin 61a moves toward the upper side on FIG. 2, the movement toward the closing direction (toward the closing position) of the first and second shutter blades 41, 42 and the urging force of the torsion spring 80 make the diaphragm blade 50 rotate in the rotate in the clockwise direction to reach the stopping-down position wherein the diaphragm blade 50 is over the aperture 30a, as shown in FIG. 2, FIG. 8, and FIG. 9.

Here, in the evacuating position, the diaphragm blade 50 remains in a predetermined evacuating position in accordance with a balance between the driving force of the driving pin 61a and the urging forces of the torsion springs 80, 90. In case the driving force of the driving pin 61a becomes greater, a left side edge 55 of the diaphragm blade 50 comes in contact with the stopper 10h, whereby its excess movement is temporarily restricted. On the other hand, in the stopping-down position, as shown in FIG. 2, FIG. 8, and FIG. 9, a right side edge 56 of the diaphragm blade 50 comes in contact with the stopper 10g, whereby its excess clockwise rotation is restricted.

The spring 70 serving as a restricting means forming part of the drive-control mechanism, as shown in FIG. 2 and FIG. 5, is held by the supporting shaft 10b of the base plate 10 and urges the first shutter blade 41 in the clockwise direction. As shown in FIG. 2, one end 71 of the torsion spring 70 touches a wall 10n of the base plate 10 (the position of the wall ion shown in FIG. 5 does not correspond to the position shown in FIG. 2 since FIG. 5 is a spread view). Also, another end 72 thereof is hooked onto a hook projection 10p of the base plate 10, and further the edge 41e of the first shutter blade 41 is capable of coming in contact with and departing from the another end 72 (the contact portion 72a shown in FIG. 6).

That is, as shown in FIG. 7, with the first and second shutter blades 41, 42 being in the opening position and the diaphragm blade 50 being in the evacuating position, the one end 71 of the torsion spring 70 is in contact with the wall 10n and the another end 72 is in contact with the hook projection 10p, thereby being restricted so as not to spread to excess. Further, the edge 41 of the first shutter blade 41 is away from the another end 72.

On the other hand, as shown in FIG. 2 and FIG. 8, with the driving pin 61a rotating in the counterclockwise direction and the diaphragm blade 50 being in the stopping-down position and further the first and second shutter blades 41, 42 being in the way position, the another end 72 of the torsion spring 70 is in contact with the hook projection lop, thereby being restricted so as not to spread to excess. Further, the edge 41e of the first shutter blade 41 is in contact with the another end 72. Therefore, although the rotor 61 tends to rotate further in the counterclockwise direction by its rotation driving force, the urging force of the torsion spring 70 overcomes and restricts excess counterclockwise rotation of the first shutter blade 41.

Further, as shown in FIG. 9, with the driving pin 61a rotating further in the counterclockwise and the diaphragm blade 50 being in the stopping-down position and further the first and second shutter blades 41, 42 being in the closing position, the another end 72 of the torsion spring 70 is pushed by the edge 41e of the first shutter blade 41 to depart from the hook projection lop, whereby the torsion spring 70 is deformed maximally. The urging force of the torsion spring 70 acts on the first and second shutter blades 41, 42 except for the condition wherein the another end 72 is in contact with the hook projection 10p. That is, when the shutter blade 40 is located between the way position wherein the diaphragm blade 50 is in the stopping down position and the closing position, the torsion spring 70 acts to urge the shutter blade 40 toward the opening position.

Thus, the adoption of the torsion spring 70 serving as a restricting means makes it possible to simplify the structure of the whole unit. Therefore, it is possible for the shutter blade 40 and the diaphragm blade 50 to function reliably and further, it is possible to downsize and lighten the whole unit.

Figure 6A:
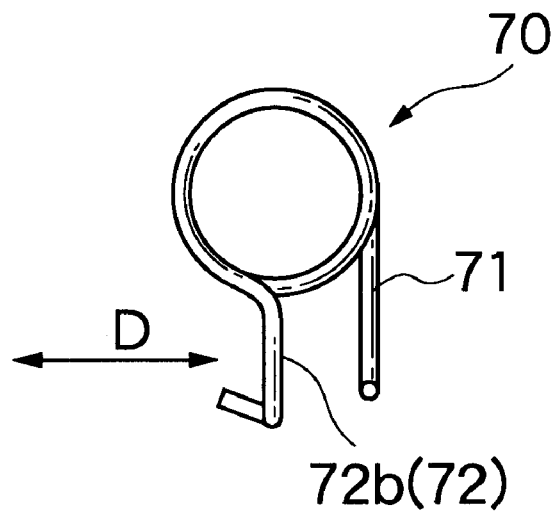
FIGS. 6A and 6B are plan and side views showing a torsion spring serving as a restricting means.
Figure 6B:
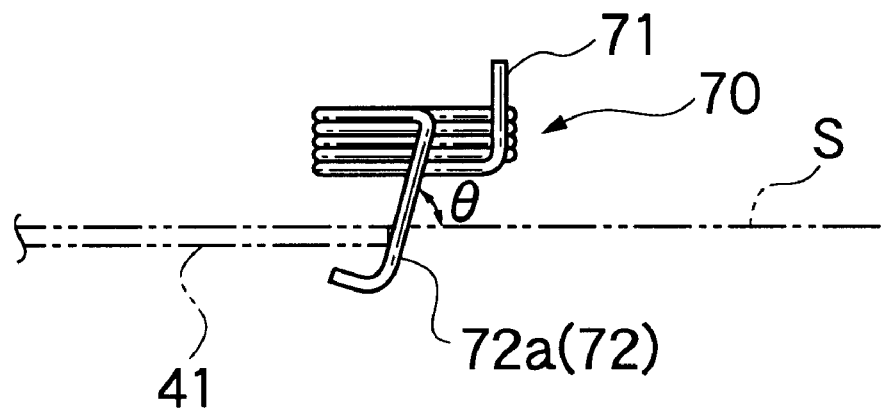

Also, the torsion spring 70 is, as shown in FIGS. 6A and 6B, formed with a straight contact portion 72a and a straight arm portion 72b. The contact portion 72a is capable of touching the edge 41e of the first shutter blade 41 with being inclined at an angle $\Theta$ to the plane S wherein the shutter blade 40 moves. This constitution can prevent only the contact portion 72a from deforming, whereby the force acting between the first shutter blade 41 and the torsion spring 70 can be efficiently transmitted.

Also, as shown in FIG. 6A, the arm portion 72b supporting the contact portion 72a is formed to extend perpendicular to a moving direction D of the first shutter blade 41. Accordingly, the operation loss of the torsion spring 70 can be reduced and its urging force can act on the shutter blade efficiently, whereby the movements of the torsion spring 70 and the first shutter blade 41 can be stabilized.

The torsion spring 90 is, as shown in FIG. 2 and FIG. 5, supported to the supporting shaft 10c' of the base pate 10. The driving pin 61a is pinched between the one end 91 and the another end 92. Also, when all of the rotation center of the rotor 61, the driving pin 61a, and the supporting shaft 10c' line up on a straight line, the torsion spring 90 becomes in an unstable condition with the largest urging force. Also, at two predetermined clockwise and counterclockwise positions that are bounded by this unstable position, the torsion spring 90 becomes in a stable condition with the smallest urging force.

That is, as shown in FIG. 7, with the shutter blade 40 being in the opening position and the diaphragm blade 50 being in the evacuating position, the torsion spring 90 is located in a first stable position. Also, as shown in FIG. 2 and FIG. 8, with the shutter blade 40 being in the way position and the diaphragm blade being in the stopping-down position, the torsion spring 90 is located in a second stable position.

Consequently, when the torsion spring 90 is in the first stable position, even though the electromagnetic drive source 60 is non-energized, by the relationship between the torsion spring 90 and the driving pin 61a, the shutter blade 40 is held in the opening position and the diaphragm blade 50 is held in the evacuating position. On the other hand, when the torsion spring 90 is in the second stable position, even though the electromagnetic drive source 60 is non-energized, by the relationship between the torsion spring 90 and the driving pin 61a, the shutter blade 40 is held in the way position and the diaphragm blade 50 is held in the stopping-down position.

With respect to the relationship between the above torsion spring 70 and the torsion spring 90, particularly when the shutter blade 40 is in the way position and the diaphragm blade 50 is in the stopping-down position, unless the torsion spring 70 deforms or deforms to a predetermined level or more, the torsion spring 90 tends to stay in the second stable position. Therefore, the shutter blade 40 is held in the way position and the diaphragm blade 50 is held in the stopping-down position.

Thus, with the electromagnetic drive source being not energized, the shutter and diaphragm blades can be held in the predetermined positions, whereby the power consumption can be reduced. Also, in comparison with a magnetic attraction force, which is obtained by magnetic pins or the like provided with the electromagnetic drive source 60, for holding the blades, the variation in holding force can be reduced, and the number of composing parts can be reduced.

Next, in case the camera shutter unit according to the above-mentioned embodiment, for example, is carried on a digital still camera, the operation will be explained taken in connection with operation views showing in FIGS. 7 to 9 and a control time chart showing in FIG. 10.

Besides, the digital still camera carrying the camera shutter unit according to his embodiment is provided with a control section (CPU, etc.) as a control means for conducting various controls, a CCD (Charge-Coupled Device) serving as a photographing element, an image signal processing circuit which memorizes image signals outputted from the CCD, a shutter release switch for shutter-releasing, a main switch and so on.

First, when an operator switches on the main switch, control signals outputted from the control section switch on the CCD to make it operate. At this time, the shutter blade 40 is in the opening position (full-opening position) wherein the aperture 30a is opened and the diaphragm blade 50 is in the evacuating position wherein the aperture 30a is not stopped down.

That is, with being non-energized, as shown in FIG. 7, since the torsion spring 90 stays in the first stable position, the rotor 61 of the electromagnetic drive source 60 is located at the clockwise rotation end, and the driving pin 61a makes the edge 41d of the first shutter blade 41 come in contact with the stopper 10e and makes the edge 42d of the second shutter blade 42 come in contact with the stopper 10d via the elongated hole 41c, the elongated hole 42c, and the contact hole 53 (the second contact portion 53b'), thereby positioning and holding the first and second shutter blades 41, 42 in the opening position, and thereby positioning and holding the diaphragm blade 50 in the stopping-down position, and further thereby holding the rotor 61 itself in its angle position via the torsion spring 90.

As described above, with the aperture 30a being opened, subject light reaches the CCD and then, on the basis of signals outputted from the CCD, the control section calculates its suitable diaphragm value, namely, judges whether or not to stop down by the diaphragm blade 50 and calculates its exposure time. Further, in the case of one operating mode that the diaphragm blade 50 does not stop down the aperture 30a, the unit stands by in the condition shown in FIG. 7 for photographing.

Here, when the shutter releasing operation is done, control signals from the control section reset the CCD. Next, the CCD starts storing up electrical charge, and after an elapse of a predetermined time, the energizing of the coil 62 is started with a predetermined current during a predetermined time such that the electromagnetic drive source 60 generates a predetermined or more level driving force which overcomes the urging force of the torsion spring 70.

As a result, from the condition shown in FIG. 7 toward the condition shown in FIG. 9, the rotor 61 of the electromagnetic 60 rotates in the counterclockwise direction, whereby the first and second shutter blades 41, 42 immediately move to the closing position and the edge 41e of the first shutter blade 41 touches the stopper 10f to stop. Then the diaphragm blade 50 moves to the stopping-down position by the urging force of the spring 80 and the force of the driving pin 61a kicking the first contact portion 53a, whereby its edge 56 touches the stopper 10g to stop.

In the above-mentioned sequence of operation, the exposure time is during from the start of electrical charge storage in the CCD to the finish of closing of the aperture 30a by the shutter blade 40. Next, the control section controls, via the image signal processing circuit and so on, to make a storage, such as on memory cards to store the photographed image signals. Accordingly, a single photographing operation is completed. After that, by signals outputted from the control section, the coil 62 is energized with a reversed current during a predetermined time. At the same time, from the condition shown in FIG. 9 toward the condition shown in FIG. 7, the rotor 61 rotates in the clockwise direction, whereby respective first and second shutter blades 41, 42 immediately move to the opening position. Next, the edge 41d of the first shutter blade 41 touches the stopper 10e and the edge 42d of the second shutter blade 42 touches the stopper 10d, thereby stopping respectively. Then, since the driving pin 61a pushes the second contact portion 53b of the contact hole 53 against the urging force of the torsion spring 80, the diaphragm blade 50 immediately moves from the aperture 30a to the evacuating position.

Thus, after stopping of the shutter blade 40 in the opening position and stopping of the diaphragm blade 40 in the evacuating position, the energizing of the coil 62 is stopped, thereby becoming in a non-energized condition. At the same time, since the torsion spring 90 stays in the first stable position, the shutter blade 40 and the diaphragm blade 50 are respectively held in the opening position and the evacuating position. That is, the use of an urging force of the torsion spring 90 in order to hold the shutter blade 40 and the diaphragm blade 50 eliminates the need to energize and can reduce the power consumption by its corresponding amount.

Figure 10:
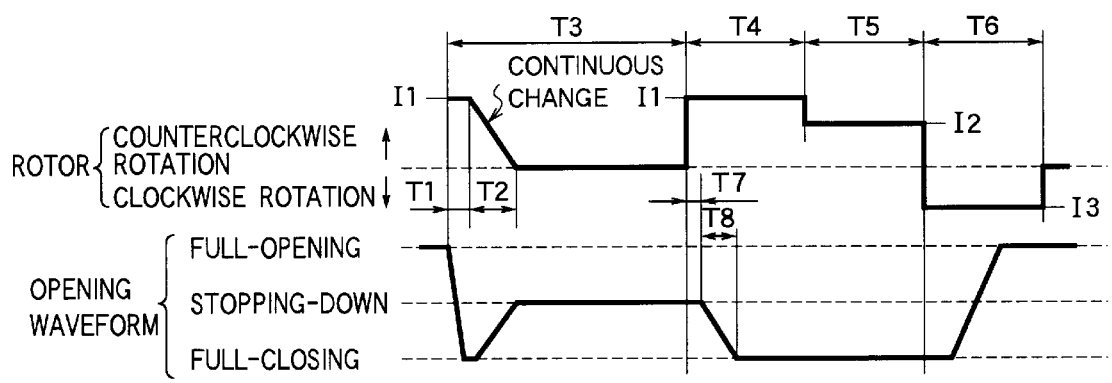
FIG. 10 is a time chart showing one embodiment of a control sequence for controlling motion of the camera shutter unit.

On the other hand, in the case of another operating mode that the control section judges on the basis of signals outputted from the CCD exposed to subject light to stop down the aperture 30a by the diaphragm blade 50, first, by signals outputted from the control section, as shown in FIG. 10, the energizing of the coil 62 is started with a predetermined current (I1), during a predetermined time (T1) and next is controlled to decrease electric current continuously during a predetermined time (T2).

As a result, the shutter blade 40 is first moved to the closing position and then is moved in reverse by a predetermined amount, and the diaphragm blade 50 moves while following the shutter blade 40 to be positioned in the stopping-down position. This energizing control prevents the diaphragm blade 50 from bouncing. Therefore, the diaphragm blade 50 can stop down rapidly and reliably.

Turning now more specifically to the energizing control, first when the rotor 61 of the electromagnetic drive source 60 rotates in the counterclockwise direction, the first shutter blade 41 starts rotating in the counterclockwise direction and the second shutter blade 42 starts rotating in the clockwise direction. At the same time, the diaphragm blade 50 starts rotating in the clockwise direction while following the second shutter blade 42 by the torsion spring 80, and further the driving pin 61a comes in contact with the first contact portion 53a and kicks the diaphragm blade 50. Next, as shown in FIG. 9, the shutter blade 40 moves (first and second shutter blades 41, 42 move) to the dosing position and the diaphragm blade 50 moves to the stopping-down position.

After that, there is the force-relationship such that the driving force of the electromagnetic drive source 60 tends to become smaller and the torsion spring 90 tends to stay in the second stable position, while the torsion spring 70 tends to return to the contact position whereat the torsion spring 70 touches the stopper 10p. By the above force-relationship, the shutter blade 40 is moved in reverse by a predetermined amount and then the diaphragm blade 50 is positioned in the stopping-down position. Thus, the shutter blade 40 is moved to excess to depress the bouncing of diaphragm blade 50, whereby the diaphragm blade 50 rapidly converges to be positioned in the stopping-down position.

According to this stopping-down operation, the diaphragm blade 50 is positioned in the stopping-down position wherein the aperture 30a is stopped down to a predetermined aperture diameter and the shutter blade 40 is (first and second shutter blades 41, 42 are) positioned in the way position between the opening a position and the closing position and stands by in the stopping down condition shown in FIG. 8 for photographing.

By the way, in this stand-by condition, the electromagnetic drive source 60 is not energized (de-energized) to be in a non-energized condition. However, since there is the force such that the torsion spring 90 tends to stay in the second stable position, the shutter blade 40 and the diaphragm blade 50 are respectively held in the way position and stopping-down position. That is, the use of a spring force of the torsion r spring 90, in order to hold the shutter blade 40 and the diaphragm blade 50, eliminates the need to energize and can reduce the power consumption by its corresponding amount.

In this stand-by condition, when the shutter-releasing operation is done, control signals from the control section reset the CCD. Next, the CCD starts storing up electrical charge and, as shown in FIG. 10, the energizing of the coil 62 is started with a predetermined current (I1) during a predetermined time (T4) such that the electromagnetic drive source 60 generates a predetermined or more level driving force which overcomes the urging forces of the torsion springs 70 and 90.

Consequently, from the condition shown in FIG. 8 toward the condition shown in FIG. 9, the rotor 61 rotates in the counterclockwise direction, whereby the shutter blade 40 moves (first and second shutter blades 41, 42 respectively move) to the dosing position and the edge 41e of the first shutter blade 41 touches the stopper 10f to stop. At this time, the driving pin 61a freely runs within the contact hole 53 with departing from the second contact portion 53b. However, since the edge 56 is in contact with the stopper 10g, the diaphragm blade 50 is held in the stopping-down position. After that, the coil 62 is energized with a current (I2) decreased to a level that can hold the shutter blade 40 in the closing position during a predetermined time (T5). As a result, the power consumption can be reduced.

In the above-mentioned sequence of operation, the exposure time is during from the start of electrical charge storage in the CCD to the finish of closing of the aperture 30a by the shutter blade 40. Next, the control section controls, via the image signal processing circuit and so on, to make a storage, such as on memory cards to store the photographed image signals. Accordingly, a single photographing operation is completed. After that, by signals outputted from the control section, the coil 62 is energized with a reversed current (I3) during a predetermined time (Th). At the same time, from the condition shown in FIG. 9 toward the condition shown in FIG. 7, the rotor 61 rotates in the clockwise direction, whereby the shutter blade 40 moves (respective first and second shutter blades 41, 42 move) to the opening position. Next, the edge 41d of the first shutter blade 41 touches the stopper 10e and the edge 42d of the second shutter blade 42 touches the stopper 10d, thereby stopping respectively. Then, since the driving pin 61a pushes the second contact portion 53b of the contact hole 53 against the urging force of the torsion spring 80, the diaphragm blade 50 moves from the aperture 30a to the evacuating position.

Thus, after stopping of the shutter blade 40 in the opening position and stopping of the diaphragm blade 40 in the evacuating position, the energizing of the coil 62 is stopped to become in a non-energized condition. At the same time, the torsion spring 90 stays in the first stable position and therefore, the shutter blade 40 and the diaphragm blade 50 are respectively held in the opening position and the closing position. That is, this energizing control is, in accordance with each operation of the shutter blade 40 and the diaphragm blade 50, to control the electromagnetic chive source 60 so as to change electric current.

In the above-mentioned control sequence of full-opening (opening position), stopping-down (stopping-down position), full-closing (closing position) and full-opening (opening position), as each energizing time T1, T2, T4, T5, T6 and time T3, for example, respectively adopted can be T1=8 ms, T2=4 ms, T4=20 ms, T5=30 ms, T6=20 ms, and T3=33 ms. Also, as each energizing current I1, I2, and I3, for example, respectively adopted can be I1=300 mA, I2=200 mA, and I3=200 mA Besides, as each time T7 and T8 indicating an opening waveform, respectively adopted can be T7=1.36 ms, and T8=0.50 ms.

According to the above-mentioned control sequence, when the aperture 30a is reopened and subject light reaches the CCD, on the basis of signals outputted from the CCD, the control section calculates its suitable diaphragm value, namely, judges whether or not to stop down by the diaphragm blade 50 and calculates its exposure time. Next, in the case of an operating mode that the diaphragm blade 50 does not stop down the aperture 30a, the unit stands by in the condition shown in FIG. 7 for photographing. While, in the case of an operating mode that the diaphragm blade 50 stops down the aperture 30a, the unit stands by in the condition shown in FIG. 8 for photographing.

Figure 11:
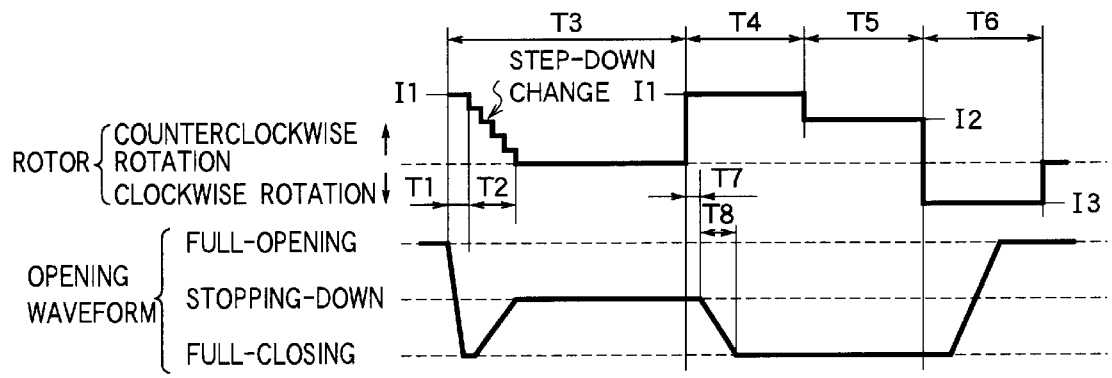
FIG. 11 is a time chart showing another embodiment of a control sequence for controlling motion of the camera shutter unit.

FIG. 11 is a time chart showing another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 11, the coil 62 is energized with a predetermined current (I1) during a predetermined time (T1) and further, is energizing-controlled to decrease electric current in the form of steps over a plurality of steps during a predetermined time (T2).

As a result, the shutter blade 40 is first moved to the closing position and then is moved in reverse by a predetermined amount, and further the diaphragm blade 50 moves while following the shutter blade 40 to be positioned in the stopping-down position. This energizing control prevents the diaphragm blade 50 from bouncing, whereby the diaphragm blade 50 can stops down rapidly and reliably. Besides, since other operation according to this energizing control is same to the above-mentioned operation, its explanation is omitted That is, this energizing control is, in accordance with each operation of the shutter blade 40 and the diaphragm blade 50, to control the electromagnetic drive source 60 so as to change electric current.

In the control sequence of full-opening (opening position), stopping-down (stopping-down position), full-closing (closing position) and full-opening (opening position) according to this energizing control, as each energizing time T1, T2, T4, T5, T6 and time T3, for example, respectively adopted can be Ti=8 ms, T2=4 ms, T4=20 ms, T5=30 ms, T6=20 ms, and T3=33 ms. Also, as each energizing current I1, I2, and I3, for example, respectively adopted can be I1=300 mA, I2=200 mA, and I3=200 mA Besides, as each time T7 and T8 indicating an opening waveform, respectively adopted can be T7=1.36 ms, and T8=0.50 ms.

Figure 12:
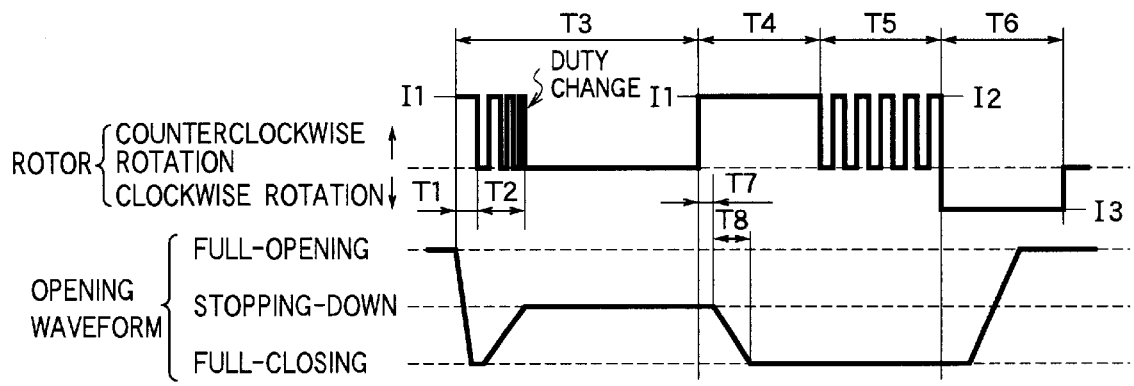
FIG. 12 is a time chart showing still another embodiment of a control sequence for controlling motion of the camera shutter unit.

FIG. 12 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 12, the coil 62 is energized with a predetermined current (I1) during a predetermined time (T1) and further, is energizing-controlled to decrease electric power continuously during a predetermined time (T2), namely, is energizing-controlled to gradually narrow down its energizing plus width (i.e. to change its duty).

As a result, the shutter blade 40 is first moved to the closing position and then is moved in reverse by a predetermined amount, and further the diaphragm blade 50 moves while following the shutter blade 40 to be positioned in the stopping-down position. This energizing control prevents the diaphragm blade 50 from bouncing, whereby the diaphragm blade 50 can stops down rapidly and reliably.

Also, by shutter-releasing operation, as shown in FIG. 9, after the shutter blade 40 moves (first and second shutter blades 41 and 42 move) to the closing position, the control section controls to decrease electric power to a level that can hold the shutter blade 40 in the closing position, namely, controls its duty so as to generate a plurality of pulses with a current (I2).

As a result, like the above-mentioned energizing control that decreases electric current, the power consumption can be reduced. Besides, since other operation according to this energizing control is same to the above-mentioned operation, its explanation is omitted. That is, this energizing control is, in accordance with each operation of the shutter blade 40 and the diaphragm blade 50, to control the electromagnetic drive source 60 to change electric power or current.

In the control sequence of full-opening (opening position), stopping-down (stopping-down position), full-closing (closing position) and full-opening (opening position) according to this energizing control, as each energizing time T1, T2, T4, T5, T6 and time T3, for example, respectively adopted can be T1=8 ms, T2=4 ms, T4=20 ms, T5=30 ms, T6=20 ms, and T3=33 ms. Also, as each energizing current I1, I2, and I3, for example, respectively adopted can be I1=300 mA, I2=300 mA, and I3=200 mA. Besides, as each time T7 and T8 indicating an opening waveform, respectively adopted can be T7=1.36 ms, and T8=0.50 ms.

Figure 13:
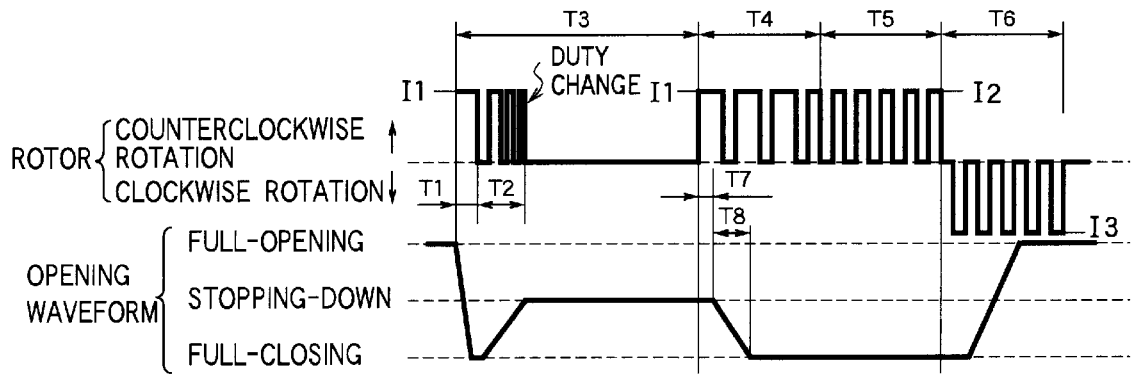
FIG. 13 is a time chart showing still another embodiment of a control sequence for controlling motion of the camera shutter unit.

FIG. 13 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 13, the coil 62 is energized with a predetermined current (I1) during a predetermined time (T1) and further, is energizing-controlled to decrease electric power continuously during a predetermined time (T2), namely, is energizing-controlled to gradually narrow down its energizing plus width (i.e. to change its duty).

As a result, the shutter blade 40 is first moved to the closing position and then is moved in reverse by a predetermined amount, and further the diaphragm blade 50 moves while following the shutter blade 40 to be positioned in the stopping-down position. This energizing control prevents the diaphragm blade 50 from bouncing, whereby the diaphragm blade 50 can stops down rapidly and reliably.

Also, when the shutter-releasing operation is done in the stand-by condition, control signals outputted from the control section rest the CCD. Next, the CCD starts storing up electrical charge and, as shown in FIG. 13, the duty-control that generates a plurality of pulses with a current (I2) is carried out during a predetermined time (T4). Next, as shown in FIG. 9, after movement of the shutter blade 40 (first and second shutter blades 41, 42 move) to the closing position, the control section controls to decrease electric power to a level that can hold the shutter blade 40 in the closing position, namely, the duty-control that generates a plurality of pulses narrower than the pulses for dosing operation with a current (I2) is carried out during a predetermined time (T5). As a result, like the above-mentioned energizing control that decreases electric current, the power consumption can be reduced.

Further, after finishing of the photographing operation, by control signals outputted from the control section, the coin 62 is energized (duty-controlled) to generate a plurality of pluses with a reversed current (I3) during a predetermined time (T6). That is, this energizing control is, in accordance with each operation of the shutter blade 40 and the diaphragm blade 50, to duty-control the electromagnetic drive source 60 to change electric power. Besides, since other operation according to this energizing control is same to the above-mentioned operation, its explanation is omitted.

In the control sequence of full-opening (opening position), stopping-down (stopping-down position), full-closing (closing position) and full-opening (opening position) according to this energizing control, as each energizing time T1, T2, T4, T5, T6 and time T3, for example, respectively adopted can be T1=8 ms, T2=4 ms, T4=20 ms, T5=30 ms, T6=20 ms, and T3=33 ms. Also, as each energizing current I1, I2, and I3, for example, respectively adopted can be I1=300 mA, I2=300 mA, and I3=300 mA Besides, as each time T7 and T8 indicating an opening waveform, respectively adopted can be T7=1.36 ms, and T8=0.50 ms.

Figure 14:
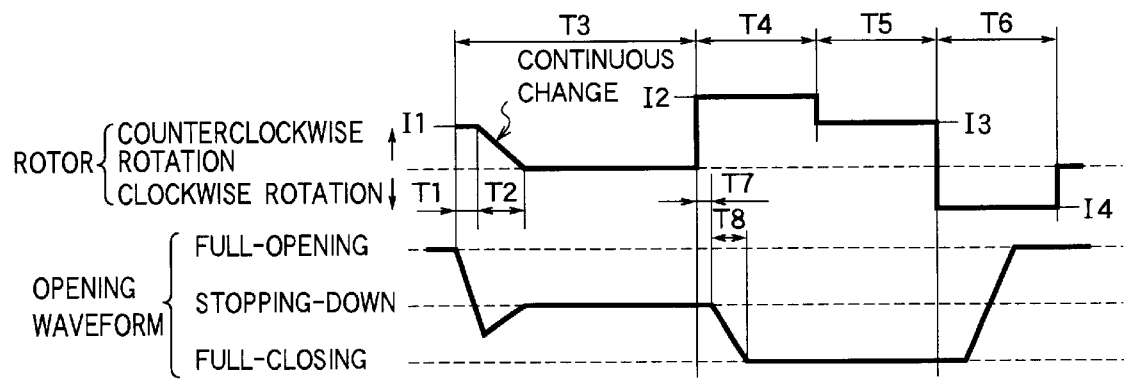
FIG. 14 is a time chart showing still another embodiment of a control sequence for controlling motion of the camera shutter unit.

FIG. 14 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 14, the coil 62 is energized with a predetermined current (I1) during a predetermined time (T1) and further, is energizing-controlled to decrease electric power continuously during a predetermined time (T2).

As a result, the shutter blade 40 is first moved to the nearby position beyond the way position corresponding to the stopping-down position and then is moved in reverse by a predetermined amount, and the diaphragm blade 50 moves while following the shutter blade 40 to be positioned in the stopping-down position. This energizing control prevents the diaphragm blade 50 from bouncing, whereby the diaphragm blade 50 can stop down rapidly and reliably.

Turning now more specifically to the energizing control, first when the rotor 61 of the electromagnetic drive source 60 rotates in the counterclockwise direction, the first shutter blade 41 starts rotating in the counterclockwise direction and the second shutter blade 42 starts rotating in the clockwise direction. At the same time, the diaphragm blade 50 starts rotating in the clockwise direction while following the second shutter blade 42 by the torsion spring 80, and further the driving pin 61a comes in contact with the first contact portion 53a and kicks the diaphragm blade 50, whereby the shutter blade 40 moves (fist and second shutter blades 41, 42 move) to the nearby position beyond the way position and the diaphragm blade 50 moves toward the stopping-down position.

After that, there is the force-relationship such that the driving force of the electromagnetic drive source 60 tends to become smaller and the torsion spring 90 tends to stay in the second stable position. By this force-relationship, the shutter blade 40 is moved in reverse by a predetermined amount and then the diaphragm blade 50 is positioned in the stopping-down position. Thus, the shutter blade 40 is moved to excess to near the way position corresponding to the stopping-down position to depress the bouncing of diaphragm blade 50, whereby the diaphragm blade 50 rapidly converges to be positioned in the stopping-down position.

According to this stopping-down operation, the diaphragm blade 50 is positioned in the stopping-down position wherein the aperture 30a is stopped down to a predetermined aperture diameter and the shutter blade 40 is (first and second shutter blades 41, 42 are) positioned in the way position between the opening position and the closing position and stands by in the stopping-down condition shown in FIG. 8 for photographing.

By the way, in this stand-by condition, the electromagnetic drive source 60 is not energized (de-energized) to be in a non-energized condition. However, since there is the force such that the torsion spring 90 tends to stay in the second stable position, the shutter blade 40 and the diaphragm blade 50 are respectively held in the way position and the stopping-down position. That is, the use of a spring force of the torsion spring 90 in order to hold shutter and diaphragm blades 40 and 50 eliminates the need to energize and can reduce the power consumption by its corresponding amount.

In this stand-by condition, when the shutter-releasing operation is done, control signals from the control section reset the CCD. Next, the CCD starts storing up electrical charge and, as shown in FIG. 14, the energizing of the coil 62 is started with a predetermined current (I2) during a predetermined time (T4) in order that the electromagnetic drive source 60 generates a predetermined or more level driving force which overcomes the urging forces of the torsion springs 70 and 90.

Consequently, from the condition shown in FIG. 8 toward the condition shown in FIG. 9, the rotor 61 rotates in the counterclockwise direction, whereby the shutter blade 40 moves (first and second shutter blades 41, 42 move) to the closing position and the edge 41e of the first shutter blade 41 touches the stopper 10f to stop. At this time, the driving pin 61a freely runs within the contact hole 53 with departing from the second contact portion 53b. However, since the edge 56 is in contact with the stopper 10g, the diaphragm blade 50 is held in the stopping-down position. After that, the coil 62 is energized with a current (I3) decreased to a level that can hold the shutter blade 40 in the dosing position during a predetermined time (T5). As a result, the power consumption can be reduced.

In the above-mentioned sequence of operation, the exposure time is during from the start of electrical charge storage in the CCD to the finish of dosing of the aperture 30a by the shutter blade 40. Next, via the image signal processing circuit and so on, the control section controls to make a storage, such as on memory cards to store the photographed image signals. Accordingly, a single photographing operation is completed. After that, by signals outputted from the control section, the coil 62 is energized with a reversed current (I4) during a predetermined time (T6). At the same time, from the condition shown in FIG. 9 toward the condition shown in FIG. 7, the rotor 61 rotates in the clockwise direction, whereby the shutter blade 40 moves (first and second shutter blades 41, 42 move) to the opening position. Next, the edge 41d of the first shutter blade 41 touches the stopper 10e and the edge 42d of the second shutter blade 42 touches the stopper 10d, thereby stopping respectively. Then, since the driving pin 61a pushes the second contact position 53b of the contact hole 53 against the urging force of the torsion spring 80, the diaphragm blade 50 moves from the aperture 30a to the evacuating position.

Thus, after stopping of the shutter blade 40 in the opening position and stopping of the diaphragm blade 40 in the evacuating position, the energizing of the coil 62 is stopped to become in a non-energized condition. At the same time, the torsion spring 90 stays in the first stable position and therefore, the shutter blade 40 and the diaphragm blade 50 are respectively held in the opening position and the closing position.

Thus, the use of a spring force of the torsion spring 90 in order to hold shutter and diaphragm blades 40, 50 eliminates the need to energize and can reduce the power consumption by its corresponding amount. That is, this energizing control is, in accordance with each operation of the shutter blade 40 and the diaphragm blade 50, to control the electromagnetic drive source 60 so as to change electric current.

In the above-mentioned control sequence of fill-opening (opening position), stopping-down (stopping-down position), full-closing (closing position) and fill-opening (opening position), as each energizing time T1, T2, T4, T5, T6 and time T3, for example, respectively adopted can be T1=8 ms, T2=4 ms, T4=20 ms, T5=30 ms, T6=20 ms, and T3=33 ms. Also, as each energizing current I1, I2, I3 and I4, for example, respectively adopted can be I1=200 mA, I2=300 mA, I3=200 mA and I4 =200 mA. Besides, as each time T7 and T8 indicating an opening waveform, respectively adopted can be T7=1.36 ms, and T8=0.50 ms.

According to the above-mentioned control sequence, when the aperture 30a is reopened and subject light reaches the CCD, on the basis of signals outputted from the CCD, the control section calculates its suitable diaphragm value, namely, judges whether or not to stop down by the diaphragm blade 50 and calculates its exposure time. Next, in the case of an operating mode that the diaphragm blade 50 does not stop down the aperture 30a, the unit stands by in the condition shown in FIG. 7 for photographing. While, in the case of an operating mode that the diaphragm blade 50 stops down the aperture 30a, the unit stands by in the condition shown in FIG. 8 for photographing.

Figure 15:
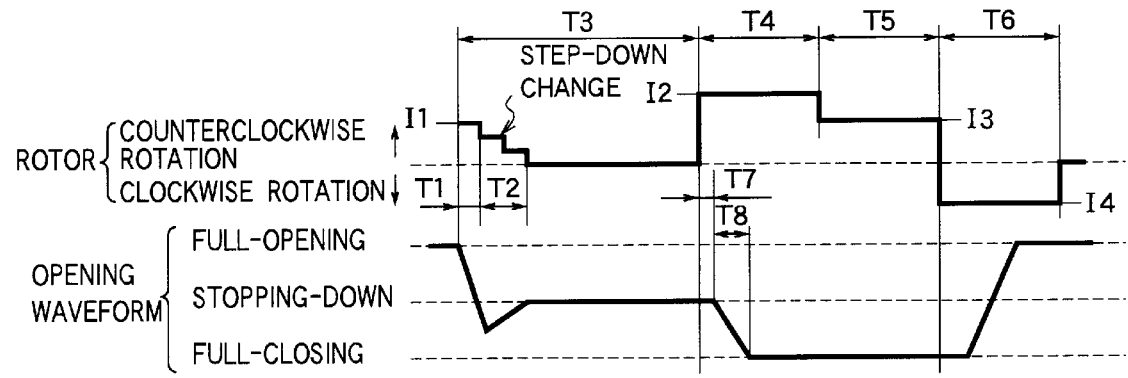
FIG. 15 is a time chart showing still another embodiment of a control sequence for controlling motion of the camera shutter unit.

FIG. 15 is a time chart showing another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 15, the coil 62 is energized with a predetermined current (I1) during a predetermined time (T1) and further, is energizing-controlled to decrease electric current in the form of steps over a plurality of steps during a predetermined time (T2).

As a result, the shutter blade 40 is first moved to the nearby position beyond the way position and then is moved in reverse by a predetermined amount, and further the diaphragm blade 50 moves while following the shutter blade 40 to be positioned in the stopping-down position. This energizing control prevents the diaphragm blade 50 from bouncing, whereby the diaphragm blade 50 can stops down rapidly and reliably. Besides, since other operation according to this energizing control is same to the above-mentioned operation, its explanation is omitted. That is, this energizing control is, in accordance with each operation of the shutter blade 40 and the diaphragm blade 50, to control the electromagnetic drive source 60 so as to change electric current.

In the control sequence of full-opening (opening position), stopping-down (stopping-down position), full-closing (closing position) and full-opening (opening position) according to this energizing control, as each energizing time T1, T2, T4, T5, T6 and time T3, for example, respectively adopted can be T1=8 ms, T2=4 ms, T4=20 ms, T5=30 ms, T6=20 ms, and T3=33 ms. Also, as each energizing current I1, I2, I3 and I4, for example, respectively adopted can be I1=200 mA, I2=300 mA, I3 =200 mA and I4=200 mA Besides, as each time T7 and T8 indicating an opening waveform, respectively adopted can be T7=1.36 ms, and T8=0.50 ms.

Figure 16:
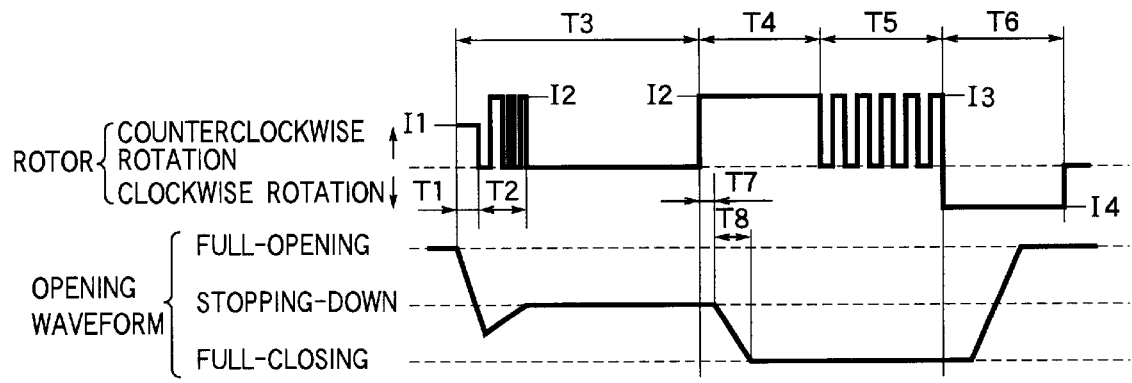
FIG. 16 is a time chart showing still another embodiment of a control sequence for controlling motion of the camera shutter unit.

FIG. 16 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 16, the coil 62 is energized with a predetermined current (I1) during a predetermined time (T1) and further, is energizing-controlled to decrease electric power continuously during a predetermined time (T2), namely, is duty-controlled to gradually narrow down its energizing plus width (i.e. to change its duty).

As a result, the shutter blade 40 is first moved to the nearby position beyond the way position and then is moved in reverse by a predetermined amount, and further the diaphragm blade 50 moves while following the shutter blade 40 to be positioned in the stopping-down position. This energizing control prevents the diaphragm blade 50 from bouncing, whereby the diaphragm blade 50 can stops down rapidly and reliably.

Also, by shutter-releasing operation, as shown in FIG. 9, after movement of the shutter blade 40 (first and second shutter blades 41, 42 move) to the closing position, the control section controls to decrease electric power to a level that can hold the shutter blade 40 in the closing position, namely, controls its duty so as to generate a plurality of pulses with a current (I3). As a result, like the above-mentioned enegizng control that decreases electric current, the power consumption can be reduced. Besides, since other operation according to this energizing control is same to the above-mentioned operation, its explanation is omitted. That is, this energizing control is, in accordance with each operation of the shutter blade 40 and the diaphragm blade 50, to control the electromagnetic drive source 60 so as to change electric power or current.

In the control sequence of full-opening (opening position), stopping-down (stopping-down position), full-closing (closing position) and full-opening (opening position) according to this energizing control, as each energizing time T1, T2, T4, T5, T6 and time T3, for example, respectively adopted can be T1=8 ms, T2=4 ms, T4=20 ms, T5=30 ms, T6=20 ms, and T3=33 ms. Also, as each energizing current I1, I2, I3 and I4, for example, respectively adopted can be I1=200 mA, I2=300 mA, I3 =300 mA and I4=200 mA. Besides, as each time T7 and T8 indicating opening waveform, respectively adopted can be T7=1.36 ms, and T8=0.50 ms.

Figure 17:
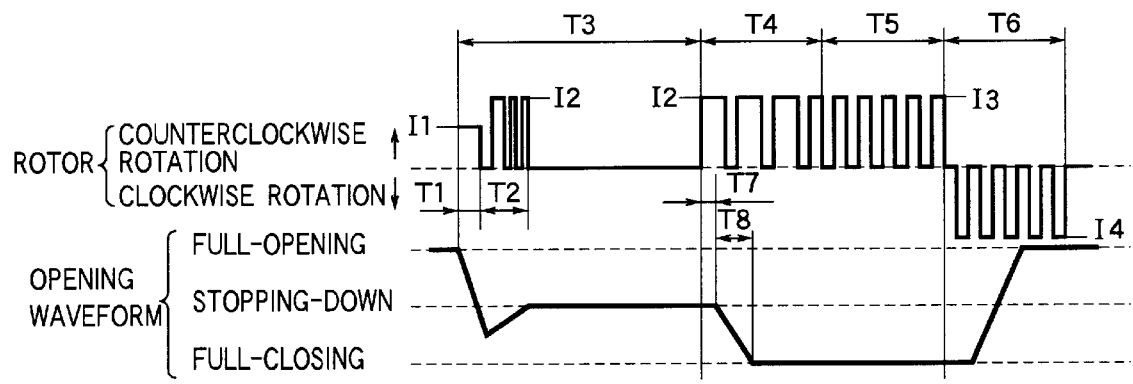
FIG. 17 is a time chart showing still another embodiment of a control sequence for controlling motion of the camera shutter unit.

FIG. 17 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 17, the coil 62 is energized with a predetermined current (I1) during a predetermined time (T1) and further, is energizing-controlled to decrease electric power continuously during a predetermined time (T2), namely, is duty-controlled to gradually narrow down its energizing plus width (i.e. to change its duty).

As a result, the shutter blade 40 is first moved to the nearby position beyond the way position and then is moved in reverse by a predetermined amount, and further the diaphragm blade 50 moves while following the shutter blade 40 to be positioned in the stopping-down position. This energizing control prevents the diaphragm blade 50 from bouncing, whereby the diaphragm blade 50 can stops down rapidly and reliably.

Also, when the shutter-releasing operation is done in the stand-by condition, control signals outputted from the control section rest the CCD. Next, the CCD starts storing up electrical charge and, as shown in FIG. 17, the duty-control that generates a plurality of pulses with a current (I2) is carried out during a predetermined time (T4). Next, as shown in FIG. 9, after movement of the shutter blade 40 (first and second shutter blades 41, 42 move) to the closing position, the control section controls to decrease electric power to a level that can hold the shutter blade 40 in the closing position, namely, the duty-control that generates a plurality of pulses narrower than the pulses for closing operation with a current (I3) is carried out during a predetermined time (T5). As a result, like the above-mentioned energizing control that decreases electric current, the power consumption can be reduced.

Further, after finishing of the photographing operation, by control signals outputted from the control section, the coin 62 is energized (duty-controlled) to generate a plurality of pluses with a reversed current (I4) during a predetermined time (T6). That is, this energizing control is, in accordance with each operation of the shutter blade 40 and the diaphragm blade 50, to duty-control the electromagnetic drive source 60 so as to change electric power. Besides, since other operation according to this energizing control is same to the above-mentioned operation, its explanation is omitted.

In the control sequence of full-opening (opening position), stopping-down (stopping-down position), full-closing (closing position) and full-opening (opening position) according to this energizing control, as each energizing time T1, T2, T4, T5, T6 and time T3, for example, respectively adopted can be T1=8 ms, T2=4 ms, T4=20 ms, T5=30 ms, T6=20 ms, and T3=33 ms. Also, as each energizing current I1, I2, I3 and I4, for example, respectively adopted can be I1=200 mA, I2=300 mA I3=300 mA and I4=300 mA Besides, as each time T7 and T8 indicating an opening waveform, respectively adopted can be T7=1.36 ms, and T8=0.50 ms.

Figure 18:
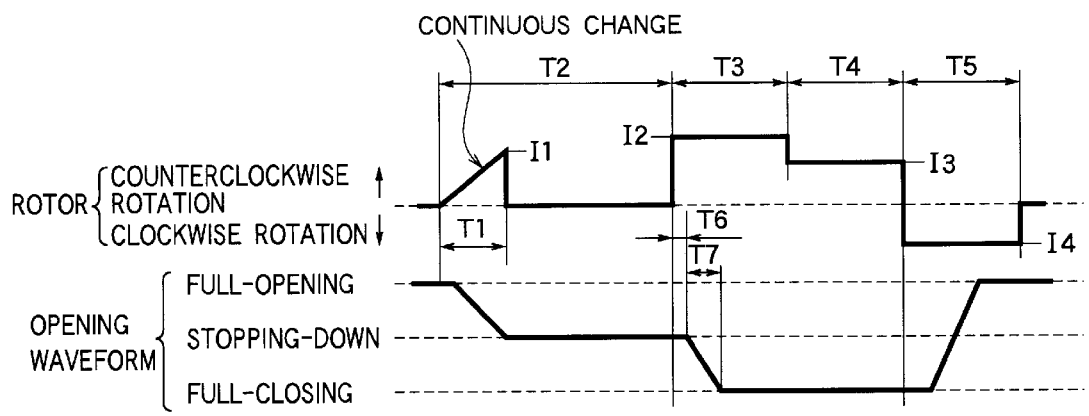
FIG. 18 is a time chart showing still another embodiment of a control sequence for controlling motion of the camera shutter unit.

FIG. 18 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely in the case of an operating mode that the control section judges to stop down the aperture 30a by the diaphragm blade 50 on the basis of signals outputted from the CCD exposed to subject light, first, by signals outputted from the control section, as shown in FIG. 18, the coil 62 is energizing-controlled to increase electric current continuously up to a maximum value (I1) during a predetermined time (T1).

As a result, the diaphragm blade 50 gradually moves from the evacuating position to the stopping-down position to be positioned in the stopping-down position. This energizing control prevents the diaphragm blade 50 from bouncing, whereby the diaphragm blade 50 can stop down reliably.

Turning now more specifically to the energizing control, first when the rotor 61 of the electromagnetic drive source 60 rotates in the counterclockwise direction, the first shutter blade 41 starts rotating in the counterclockwise direction and the second shutter blade 42 starts rotating in the clockwise direction. At the same time, the diaphragm blade 50 starts rotating in the clockwise direction while following the second shutter blade 42 by the torsion spring 80, and further the driving pin 61a comes in contact with the first contact portion 53a and pushes out the diaphragm blade 50, whereby the shutter blade 40 gradually approaches (first and second shutter blades 41, 42 gradually approach) the way position and the diaphragm blade 50 moves toward the stopping-down position while following the shutter blade 40.

After that, there is the force-relationship such that the driving force of the electromagnetic drive source 60 tends to become smaller and the torsion spring 90 tends to stay in the second stable position. By this force-relationship, the shutter blade 40 is positioned in the way position and then the diaphragm blade 50 is positioned in the stopping-down position. Thus, since the diaphragm blade 50 approaches the stopping-down position gradually from the evacuating position, the bouncing of diaphragm 50 can be prevented and the diaphragm blade 50 can be reliably positioned in the stopping-down position.

According to this stopping-down operation, the diaphragm blade 50 is positioned in the stopping-down position wherein the aperture 30a is stopped down to a predetermined aperture diameter and the shutter blade 40 is (first and second shutter blades 41, 42 are) positioned in the way position between the opening position and the closing position and stands by in the stopping-down condition shown in FIG. 8 for photographing.

By the way, in this stand-by condition, the electromagnetic drive source 60 is not energized (de-energized) to be in a non-energized condition. However, since there is the force such that the torsion spring 90 tends to stay in the second stable position, the shutter blade 40 and the diaphragm blade 50 are respectively held in the way position and the stopping-down position. That is, the use of a spring force of the torsion spring 90 in order to hold shutter and diaphragm blades 40 and 50 eliminates the need to energize and can reduce the power consumption by its corresponding amount.

In this stand-by condition, when the shutter-releasing operation is done, control signals from the control section reset the CCD. Next, the CCD starts storing up electrical charge and, as shown in FIG. 18, the energizing of the coil 62 is started with a predetermined current (I2) during a predetermined time (T3) in order that the electromagnetic drive source 60 generates a predetermined or more level driving force which overcomes the urging forces of the torsion springs 70 and 90.

Consequently, from the condition shown in FIG. 8 toward the condition shown in FIG. 9, the rotor 61 rotates in the counterclockwise direction, whereby the shutter blade 40 moves (first and second shutter blades 41, 42 move) to the closing position and the edge 41e of the first shutter blade 41 touches the stopper 10f to stop. At this time, the driving pin 61a freely runs within the contact hole 53 with departing from the second contact portion 53b. However, since the edge 56 is in contact with the stopper 10g, the diaphragm blade 50 is held in the stopping-down position. After that, the coil 62 is energized with a current (I3) decreased to a level that can hold the shutter blade 40 in the closing position during a predetermined time (T4). As a result, the power consumption can be reduced.

In the above-mentioned sequence of operation, the exposure time is during from the start of electrical charge storage in the CCD to the finish of closing of the aperture 30a by the shutter blade 40. Next, via the image signal processing circuit and so on, the control section controls to make a storage, such as on memory cards to store the photographed image signals. Accordingly, a single photographing operation is completed. After that, by signals outputted from the control section, the coil 62 is energized with a reversed current (I4) during a predetermined time (T5). At the same time, from the condition shown in FIG. 9 toward the condition shown in FIG. 7, the rotor 61 rotates in the clockwise direction, whereby the shutter blade 40 moves (first and second shutter blades 41, 42 move) to the opening position. Next, the edge 41d of the first shutter blade 41 touches the stopper 10e and the edge 42d of the second shutter blade 42 touches the stopper 10d, thereby stopping respectively. Then, since the driving pin 61a pushes the second contact portion 53b of the contact hole 53 against the urging force of the torsion spring 80, the diaphragm blade 50 moves from the aperture 30a to the evacuating position.

Thus, after stopping of the shutter blade 40 in the opening position and stopping of the diaphragm blade 40 in the evacuating position, the energizing of the coil 62 is stopped to become in a non-energized condition. At the same time, the torsion spring 90 stays in the first stable position and therefore, the shutter blade 40 and the diaphragm blade 50 are respectively held in the opening position and the closing position.

Thus, the use of a spring force of the torsion spring 90 in order to hold shutter and diaphragm blades 40, 50 eliminates the need to energize and can reduce the power consumption by its corresponding amount. That is, this energizing control is, in accordance with each operation of the shutter blade 40 and the diaphragm blade 50, to control the electromagnetic drive source 60 so as to change electric current.

In the above-mentioned control sequence of full-opening (opening position), stopping-down (stopping-down position), full-closing (dosing position) and full-opening (opening position), as each energizing time T1, T3, T4, T5 and time T2, for example, respectively adopted can be T1=12 ms, T3=20 ms, T4=30 ms, T5=20 ms, and T2=33 ms. Also, as each energizing current I1, I2, I3 and I4, for example, respectively adopted can be I1=250 mA, I2=300 mA, I3=200 mA and I4=200 mA. Besides, as each time T6 and T7 indicating an opening waveform, respectively adopted can be T6=1.36 ms, and T7=0.50 ms.

According to the above-mentioned control sequence, when the aperture 30a is reopened and subject light reaches the CCD, on the basis of signals outputted from the CCD, the control section calculates its suitable diaphragm value, namely, judges whether or not to stop down by the diaphragm blade 50 and calculates its exposure time. Next, in the case of an operating mode that the diaphragm blade 50 does not stop down the aperture 30a, the unit stands by in the condition shown in FIG. 7 for photographing. While, in the case of an operating mode that the diaphragm blade 50 stops down the aperture 30a, the unit stands by in the condition shown in FIG. 8 for photographing.

Figure 19:
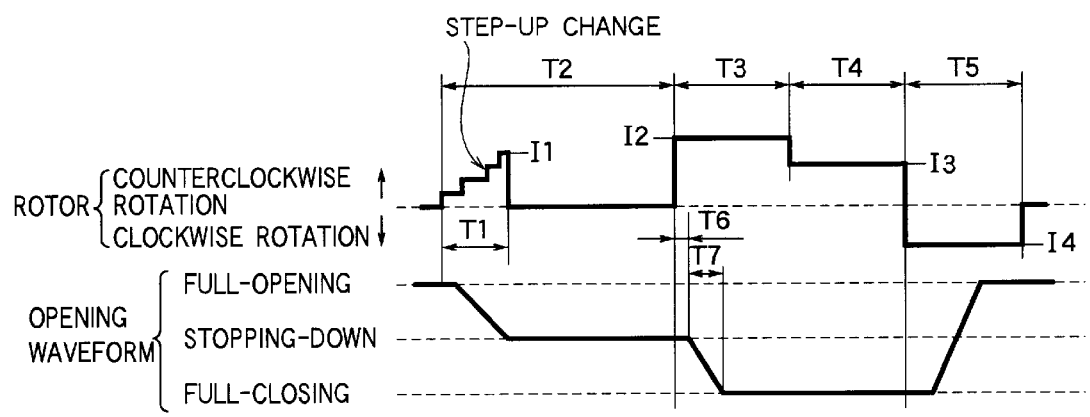
FIG. 19 is a time chart showing still another embodiment of a control sequence for controlling motion of the camera shutter unit.

FIG. 19 is a time chart showing another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely in the case of an operating mode that the control section judges to stop down the aperture 30a by the diaphragm blade 50 on the basis of signals outputted from the CCD exposed to subject light, first, by signals outputted from the control section, as shown in FIG. 19, the coil 62 is energizing-controlled to increase electric current in the forms of a plurality of steps up to a maximum value (I1) during a predetermined time (T1). As a result, the diaphragm blade 50 gradually moves from the evacuating position to the stopping-down position to be positioned. This energizing control prevents the diaphragm blade 50 from bouncing, and the diaphragm blade 50 can stop down reliably. Besides, since other operation according to this energizing control is same to the above-mentioned operation, its explanation is omitted That is, this energizing control is, in accordance with each operation of the shutter blade 40 and the diaphragm blade 50, to control the electromagnetic drive source 60 so as to change electric current.

In the control sequence of full-opening (opening position), stopping-down (stopping-down position), full-closing (closing position) and full-opening (opening position) according to this energizing control, as each energizing time T1, T3, T4, T5, and time T2, for example, respectively adopted can be T1=12 ms, T3=20 ms, T4=30 ms, T5=20 ms, and T2=33 ms. Also, as each energizing current I1, I2, I3 and I4, for example, respectively adopted can be I1=250 mA, I2=300 mA, I3=200 mA and I4=200 mA Besides, as each time T6 and T7 indicating an opening waveform, respectively adopted can be T6=1.36 ms, and T7=0.50 ms.

Figure 20:
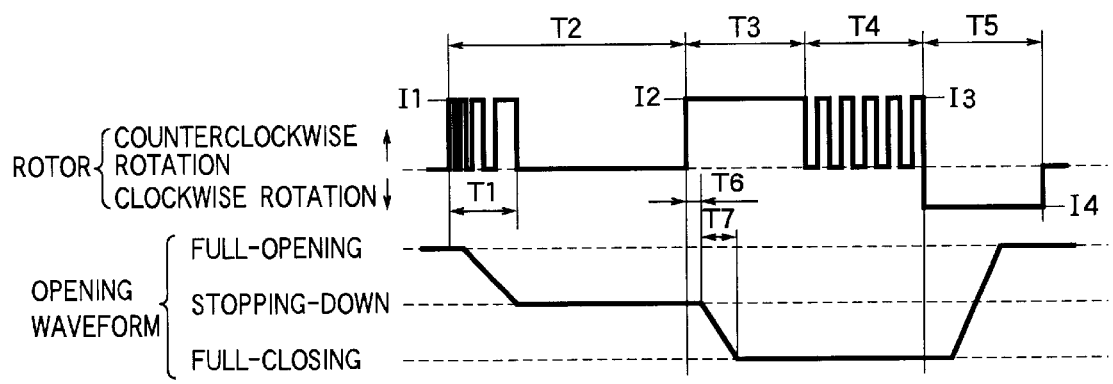
FIG. 20 is a time chart showing still another embodiment of a control sequence for controlling motion of the camera shutter unit.

FIG. 20 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 20, the coil 62 is energizing-controlled to increase electric power continuously during a predetermined time (T1), namely, is duty-controlled to gradually widen its energizing plus width (i.e. to change its duty) with a predetermined current (I1) during a predetermined time (T1).

As a result, the diaphragm blade 50 gradually moves from the evacuating position to the stopping-down position to be positioned. This energizing control prevents the diaphragm blade 50 from bouncing, whereby the diaphragm blade 50 can stop down reliably.

Also, by shutter-releasing operation, as shown in FIG. 9, after movement of the shutter blade 40 (first and second shutter blades 41, 42 move) to the closing position, the control section controls to decrease electric power to a level that can hold the shutter blade 40 in the closing position, namely, controls its duty so as to generate a plurality of pulses with a current (I3) during a predetermined time (T4).

As a result, like the above-mentioned energizing control that decreases electric current, the power consumption can be reduced. Besides, since other operation according to this energizing control is same to the above-mentioned operation, its explanation is omitted. That is, this energizing control is, in accordance with each operation of the shutter blade 40 and the diaphragm blade 50, to control the electromagnetic drive source 60 so as to change electric power or current.

In the control sequence of full-opening (opening position), stopping-down (stopping-down position), full-closing (dosing position) and full-opening (opening position) according to this energizing control, as each energizing time T1, T3, T4, T5, and time T2, for example, respectively adopted can be T1=12 ms, T3=20 ms, T4=30 ms, T5=20 ms, and T2=33 ms. Also, as each energizing current I1, I2, I3, and I4, for example, respectively adopted can be I1=300 mA, I2=300 mA, I3=300 mA, and I4=200 mA Besides, as each time T6 and T7 indicating an opening waveform, respectively adopted can be T6=1.36 ms, and T7=0.50 ms.

Figure 21:
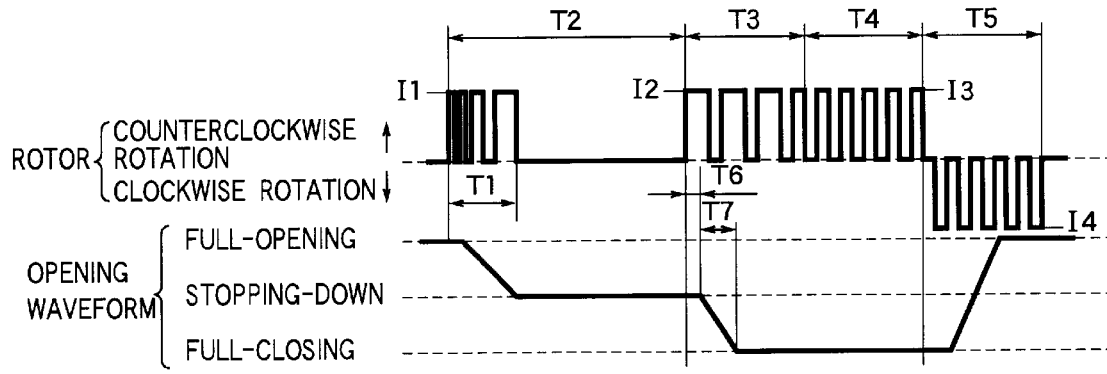
FIG. 21 is a time chart showing still another embodiment of a control sequence for controlling motion of the camera shutter unit.

FIG. 21 is a time chart showing still another control sequence for controlling the operation of the camera shutter unit of the present embodiment. In this control sequence, on the basis of signals outputted from the CCD which is exposed to subject light, the control section calculates its suitable diaphragm value, i.e., judges whether or not to stop down by the diaphragm blade 50. The mode that the diaphragm blade 50 does not stop down the aperture 30a is controlled as same to the above-mentioned control sequence, while only the energizing method for control operation in which the diaphragm blade 50 stops down the aperture 30a is different from the above-mentioned control sequence. Therefore, only this different control operation will be explained.

Namely, in the case of an operating mode that the control section judges to stop down the aperture 30a by the diaphragm blade 50 on the basis of signals outputted from the CCD exposed to subject light, first, by signals outputted from the control section, as shown in FIG. 21, the coil 62 is energizing-controlled to increase electric power continuously during a predetermined time (T1), namely, is duty-controlled to gradually widen its energizing plus width i.e. to change its duty) with a predetermined current (I1) during a predetermined time (T1).

As a result, the diaphragm blade 50 gradually moves from the evacuating position to the stopping-down position to be positioned. This energizing control prevents the diaphragm blade 50 from bouncing, whereby the diaphragm blade 50 can stop down reliably.

Also, when the shutter-releasing operation is done in the stand-by condition, control signals outputted from the control section rest the CCD. Next, the CCD starts storing up electrical charge and, as shown in FIG. 21, the duty-control that generates a plurality of pulses with a current (I2) is carried out during a predetermined time (T3). Next, as shown in FIG. 9, after movement of the shutter blade 40 (first and second shutter blades 41, 42 move) to the closing position, the control section controls to decrease electric power to a level that can hold the shutter blade 40 in the closing position, namely, the duty-control that generates a plurality of pulses narrower than the pulses for the closing operation with a current (I3) is carried out during a predetermined time (T4). As a result, like the above-mentioned energizing control that decreases electric current, the power consumption can be reduced. Further, after finishing of the photographing operation, by control signals outputted from the control section, the coin 62 is energizing-controlled (duty-controlled) to generate a plurality of pluses with a reversed current (I4) during a predetermined time (T5).

That is, this energizing control is, in accordance with each operation of the shutter blade 40 and the diaphragm blade 50, to duty-control the electromagnetic drive source 60 so as to change electric power. Besides, since other operation according to this energizing control is same to the above-mentioned operation, its explanation is omitted.

In the control sequence of full-opening (opening position), stopping-down (stopping-down position), full-closing (closing position) and full-opening (opening position) according to this energizing control, as each energizing time T1, T3, T4, T5, and time T2, for example, respectively adopted can be T1=12 ms, T3=20 ms, T4=30 ms, T5=20 ms, and T2=33 ms. Also, as each energizing current I1, I2, I3 and I4, for example, respectively adopted can be I1=300 mA, I2=300 mA, I3=300 mA and I4=300 mA. Besides, as each time T6 and T7 indicating an opening waveform, respectively adopted can be T7=1.36 ms, and T8=0.50 ms.

In the above-mentioned embodiment, the adaptation of the camera shutter unit according to the present invention is shown as to a digital still camera, however, is not limited thereto. The camera shutter unit can be adapted to other cameras such as a film type camera or the like.

Also, in the camera shutter unit of the above-mentioned embodiment, the shutter blade 40 is composed of two blades of first and second shutter blades 41, 42, however, is not limited thereto. The constituent composed of one, three or more shutter blades can be adopted.

Further, as means for holding (or keeping) the shutter blade 40 in the opening position and the diaphragm blade 50 in the evacuating position, the torsion spring 90 having two stable positions is adopted. However, the means, which is not limited thereto, may be magnetic pins provided with the electromagnetic drive source 60, which generate a magnetic attraction force that holds them with being non-energized.

As mentioned above, according to the camera shutter unit of the present invention, as a drive-control mechanism for drive-controlling to move shutter and diaphragm blades at a desired timing, adopted are a single electromagnetic drive source capable of driving to interlock the diaphragm blade with the shutter blade, a restricting means for restricting movement of the shutter blade toward the closing position when the diaphragm blade is positioned in the stopping-down position and for releasing its restriction by a predetermined or more level drive force which is generated by the electromagnetic drive source, and a control means for controlling the electromagnetic drive source. Further, upon stopping-down operation, the control means controls energizing of the electromagnetic drive source to move the shutter blade to the closing position in advance and next move in reverse the shutter blade by a predetermined amount, to move the shutter blade up to a nearby position beyond the way position corresponding to the stopping-down position in advance and next move in reverse it by a predetermined amount, or to move the diaphragm blade gradually from the evacuating position to the stopping-down position, thereby positioning the diaphragm blade in the stopping-down position. Accordingly, the unit can be downsized and lightened. Also, the bouncing of diaphragm blade can be prevented, whereby the stopping-down operation can be carried out rapidly and reliably.

Also, the torsion spring is adopted in order to interlock the diaphragm blade with the shutter blade and its both ends are hooked on shutter and diaphragm blades respectively, whereby the looseness between both can be absorbed and the variation in initial setting load of the torsion spring can be prevented Also, as means for holding shutter and diaphragm blades in the opening position and the evacuating position and further in the way position and the stopping-down position, the torsion spring is adopted, whereby the variation in holding force can be reduced and the number of composing parts can be reduced.

Also, as a restricting means, the torsion spring is adopted and the contact portion being in contact with the shutter blade is inclined to the plane wherein the shutter blade moves. Accordingly, the working force between the torsion spring and the shutter blade is efficiently transmitted. Further, the arm portion of the torsion spring supporting the contact portion extends perpendicular to the moving direction of the shutter blade. Accordingly, the operation loss of the torsion spring can be reduced and the operation can be stabilized. Furthermore, the diaphragm blade is provided with the first contact portion and the second contact portion. Accordingly, the response characteristic of diaphragm blade can be improved and the operating angle of the diaphragm blade can be increased.

It is further understood by those skill in the art that the foregoing description is a preferred embodiment of the disclosed unit and that various changes and modifications may be made in the invention without departing from the spirit and scope thereof.

What is claimed is:

1. A camera shutter unit comprising:
   a base plate having an exposure aperture;
   a diaphragm blade arranged to be capable of moving between a stopping-down position wherein the aperture is stopped down and an evacuating position wherein the aperture is opened;
   a shutter blade arranged to be capable of moving between an opening position wherein the aperture is opened and a closing position wherein the aperture is closed; and
   a drive-control mechanism for drive-controlling the shutter blade and the diaphragm blade, the drive-control mechanism including
      a single electromagnetic drive source capable of driving the shutter blade and the diaphragm blade to interlock the diaphragm blade with the shutter blade so that the opening position corresponds to the evacuating position and a travel of from a way position between the opening position and the closing position to the closing position corresponds to the stopping-down position,
      a restricting means for restricting movement of the shutter blade toward the closing position when the diaphragm blade is positioned in the stopping-down position and for releasing its restriction by a predetermined or more level drive force generated by the electromagnetic drive source, and
      a control means for controlling the electromagnetic drive source, the control means controlling to move the shutter blade to the closing position in advance and next move in reverse the shutter blade by a predetermined amount when moving to position the diaphragm blade in the stopping down position.

2. A camera shutter unit as set forth in claim 1, wherein the control means controls the electromagnetic drive source to decrease electric current continuously when moving to position the diaphragm blade in the stopping-down position.

3. A camera shutter unit as set forth in claim 1, wherein the control means controls the electromagnetic drive source to decrease electric current in the form of steps when moving to position the diaphragm blade in the stopping-down position.

4. A camera shutter unit as set forth in claim 1, wherein the control means controls the electromagnetic drive source to decrease electric power continuously when moving to position the diaphragm blade in the stopping-down position.

5. A camera shutter unit as set forth in claim 1, wherein the control means controls the electromagnetic drive source to change electric current in accordance with each operation of the shutter blade and the diaphragm blade.

6. A camera shutter unit as set forth in claim 1, wherein the control means controls the electromagnetic drive source to change electric power in accordance with each operation of the shutter blade and the diaphragm blade.

7. A camera shutter unit comprising:
   a base plate having an exposure aperture;
   a diaphragm blade arranged to be capable of moving between a stopping-down position wherein the aperture is stopped down and an evacuating position wherein the aperture is opened;
   a shutter blade arranged to be capable of moving between an opening position wherein the aperture is opened and a closing position wherein the aperture is closed; and
   a drive-control mechanism for drive-controlling the shutter blade and the diaphragm blade, the drive-control mechanism including
      a single electromagnetic drive source capable of driving the shutter blade and the diaphragm blade to interlock the diaphragm blade with the shutter blade so that the opening position corresponds to the evacuating position and a travel of from a way position between the opening position and the closing position to the closing position corresponds to the stopping-down position,
      a restricting means for restricting movement of the shutter blade toward the closing position when the diaphragm blade is positioned in the stopping-down position and for releasing its restriction by a predetermined or more level drive force generated by the electromagnetic drive source, and
      a control means for controlling the electromagnetic drive source, the control means controlling to move the shutter blade up to a nearby position beyond a way position corresponding to the stopping-down position in advance and next move in reverse the shutter blade by a predetermined amount when moving to position the diaphragm blade in the stopping-down position.

8. A camera shutter unit as set forth in claim 7, wherein the control means controls the electromagnetic drive source to decrease electric current continuously when moving to position the diaphragm blade in the stopping-down position.

9. A camera shutter unit as set forth in claim 7, wherein the control means controls the electromagnetic drive source to decrease electric current in the form of steps when moving to position the diaphragm blade in the stopping-down position.

10. A camera shutter unit as set forth in claim 7, wherein the control means controls the electromagnetic drive source to decrease electric power continuously when moving to position the diaphragm blade in the stopping-down position.

11. A camera shutter unit as set forth in claim 7, wherein the control means controls the electromagnetic drive source to change electric current in accordance with each operation of the shutter blade and the diaphragm blade.

12. A camera shutter unit as set forth in claim 7, wherein the control means controls the electromagnetic drive source to change electric power in accordance with each operation of the shutter blade and the diaphragm blade.

13. A camera shutter unit comprising:
   a base plate having an exposure aperture;
   a diaphragm blade arranged to be capable of moving between a stopping-down position wherein the aperture is stopped down and an evacuating position wherein the aperture is opened;
   a shutter blade arranged to be capable of moving between an opening position wherein the aperture is opened and a closing position wherein the aperture is closed; and
   a drive-control mechanism for drive-controlling the shutter blade and the diaphragm blade, the drive-control mechanism including
      a single electromagnetic drive source capable of driving the shutter blade and the diaphragm blade to interlock the diaphragm blade with the shutter blade so that the opening position corresponds to the evacuating position and a travel of from a way position between the opening position and the closing position to the closing position corresponds to the stopping-down position,
      a restricting means for restricting movement of the shutter blade toward the closing position when the diaphragm blade is positioned in the stopping-down position and for releasing its restriction by a predetermined or more level drive force generated by the electromagnetic drive source, and a control means for controlling the electromagnetic drive source, the control means controlling to move the shutter blade gradually from the evacuating position to the stopping-down position when moving to position the diaphragm blade in the stopping-down position.

14. A camera shutter unit as set forth in claim 13, wherein the control means controls the electromagnetic drive source to increase electric current continuously when moving to position the diaphragm blade in the stopping-down position.

15. A camera shutter unit as set forth in claim 13, wherein the control means controls the electromagnetic drive source to increase electric current in the form of steps when moving to position the diaphragm blade in the stopping-down position.

16. A camera shutter unit as set forth in claim 13, wherein the control means controls the electromagnetic drive source to increase electric power continuously when moving to position the diaphragm blade in the stopping-down position.

17. A camera shutter unit as set forth in claim 13, wherein the control means controls the electromagnetic drive source to change electric current in accordance with each operation of the shutter blade and the diaphragm blade.

18. A camera shutter unit as set forth in claim 13, wherein the control means controls the electromagnetic drive source to change electric power in accordance with each operation of the shutter blade and the diaphragm blade.

19. A camera shutter unit as set forth in claim 1, wherein the control means controls the electromagnetic drive source to decrease electric current to a predetermined level capable of holding the shutter blade in the closing position, after positioning the shutter blade in the closing position.

20. A camera shutter unit as set forth in claim 1, wherein the control means controls the electromagnetic drive source to decrease electric power to a predetermined level capable of holding the shutter blade in the closing position, after positioning the shutter blade in the closing position.

21. A camera shutter unit as set forth in claim 1, wherein the unit comprises a torsion spring for interlocking the diaphragm blade with the shutter blade, one end of the torsion spring is hooked on the diaphragm blade and another end of the torsion spring is hooked on the shutter blade.

22. A camera shutter unit as set forth in claim 1, wherein the unit comprises a spring engaged with a part of the electromagnetic drive source in order to position and hold the shutter blade in the opening position and the diaphragm blade in the evacuating position with the electromagnetic drive source being non-energized.

23. A camera shutter unit as set forth in claim 1, wherein the unit comprises a spring engaged with a part of the electromagnetic drive source in order to position and hold the shutter blade in the way position and the diaphragm blade in the stopping-down position with the electromagnetic drive source being non-energized.

24. A camera shutter unit as set forth in claim 1, wherein the restricting means is of a torsion spring for urging the shutter blade toward the opening position when the shutter blade is located between the closing position and the way position wherein the diaphragm blade is in the stopping-down position and the torsion spring has a straight contact portion capable of coming in contact with the shutter blade and inclined to a plane wherein the diaphragm blade moves.

25. A camera shutter unit as set forth in claim 1, wherein the restricting means is of a torsion spring for urging the shutter blade toward the opening position when the shutter blade is located between the closing position and the way position wherein the diaphragm blade is in the stopping-down position and the torsion spring has a straight contact portion capable of coming in contact with the shutter blade and inclined to a plane wherein the diaphragm blade moves, and an arm portion supporting the straight contact portion and extending perpendicular to a moving direction of the shutter blade.

26. A camera shutter unit as set forth in claim 1, wherein the electromagnetic drive source comprises a rotor having a driving pin, a coil for energizing, and a yoke forming a magnetic circuit, and the diaphragm blade has a first contact portion with which the driving pin comes in contact temporarily to drive enroute to stopping-down position from the evacuating position.

27. A camera shutter unit as set forth in claim 1, wherein the electromagnetic drive source comprises a rotor having a driving pin, a coil for energizing, and a yoke forming a magnetic circuit, and the diaphragm blade has a second contact portion which extends perpendicular to a moving direction of the driving pin in both side regions of the stopping-down position and the evacuating position and with which the driving pin comes in contact to drive.

28. A camera shutter unit as set forth in claim 1, wherein the shutter blade and the diaphragm blade are arranged within a common blade room.

* * * * *